United States Patent
Kameyama et al.

(10) Patent No.: US 6,428,689 B1
(45) Date of Patent: Aug. 6, 2002

(54) WATER PURIFYING AND DISPENSING APPARATUS, AND METHOD OF PURIFYING CHLORINE-CONTAINING WATER

(75) Inventors: Bunichiro Kameyama; Homare Aman; Soichi Matsuzoe; Hiroshi Yamamoto; Kimitaka Takano; Nobuyuki Endo; Tsutomu Maezawa, all of Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/491,798

(22) Filed: Jan. 26, 2000

(30) Foreign Application Priority Data

Jan. 27, 1999 (JP) .......................... 11-017936
Jan. 27, 1999 (JP) .......................... 11-017938

(51) Int. Cl.[7] .............................. C02F 1/46; B67D 5/56; B01J 19/08
(52) U.S. Cl. ................ 210/120; 210/138; 210/149; 210/181; 210/259; 210/748; 204/228.1; 204/229.4; 204/660; 204/663; 222/129.1; 222/129.3
(58) Field of Search ................ 210/748, 739, 210/120, 138, 141, 143, 181, 252, 259, 263, 282, 149, 436, 472; 204/228.1, 240, 661, 663, 665, 229.2, 229.4; 222/640, 641, 146.6, 282, 310, 129.1, 129.3

(56) References Cited

U.S. PATENT DOCUMENTS

| | | | |
|---|---|---|---|
| 4,123,341 A | * 10/1978 | Gnieser et al. | |
| 4,160,711 A | * 7/1979 | Nishizawa et al. | |
| 4,334,968 A | * 6/1982 | Sweeney | |
| 4,402,197 A | 9/1983 | Groult et al. | 68/12 R |
| 4,422,919 A | 12/1983 | Fabian et al. | 204/270 |
| 4,585,539 A | * 4/1986 | Edson | |
| 5,510,009 A | * 4/1996 | Arai et al. | |
| 5,645,716 A | 7/1997 | Izaguirre-Martinez et al. | 210/97 |
| 5,744,028 A | * 4/1998 | Goto et al. | |
| 5,928,505 A | 7/1999 | Inakagata et al. | 210/91 |
| 5,928,506 A | 7/1999 | Bae | 210/94 |
| 6,045,704 A | * 4/2000 | Sato et al. | |

FOREIGN PATENT DOCUMENTS

| CH | 634217 | 1/1983 |
|---|---|---|
| DE | 3714200 | 11/1988 |
| DE | 9016603.5 | 2/1991 |
| JP | 59-150950 | 8/1994 |
| JP | 08-173967 | 7/1996 |
| JP | 09-001149 | 1/1997 |
| JP | 09-001150 | 1/1997 |
| JP | 11114566 | 4/1999 |
| JP | 11114567 | 4/1999 |
| JP | 11156363 | 6/1999 |
| JP | 11192488 | 7/1999 |

* cited by examiner

Primary Examiner—David A. Simmons
Assistant Examiner—Fred Prince
(74) Attorney, Agent, or Firm—Fish & Richardson P.C.

(57) ABSTRACT

A water purification apparatus and methods for the purification of water are provided. The invention features an atmospherically-isolated, but ventable, reservoir electrolysis cell with control features for selecting an electrolysis duration depending on temperature, time since last electrolysis, or time since last gas venting. The device and associated method can easily take a wide range of input water qualities into account for the production of an effective amount of sterilizing water.

23 Claims, 12 Drawing Sheets

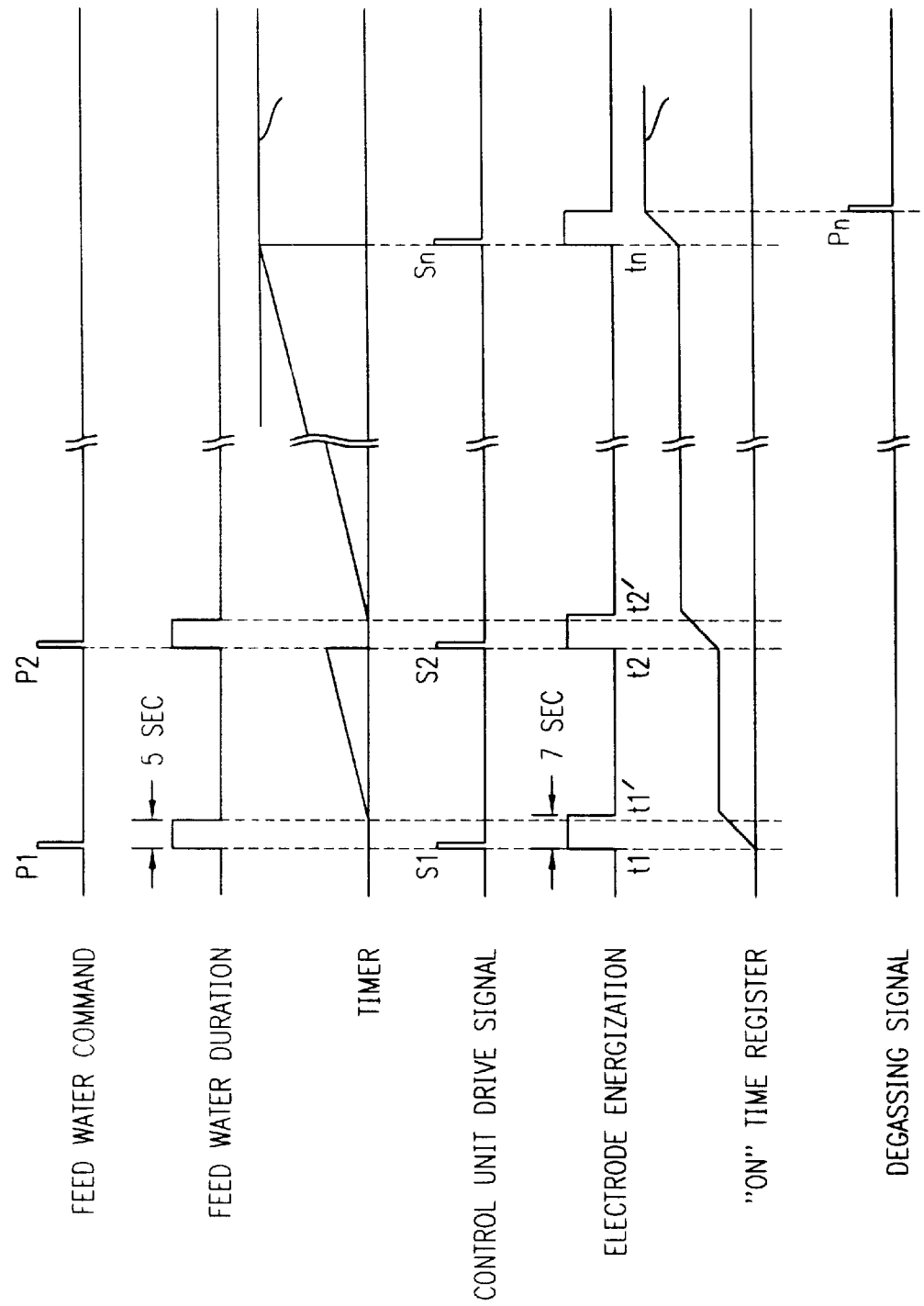

ACTIVE CHLORINE GENERATING EFFICIENCY

FIG. 13A
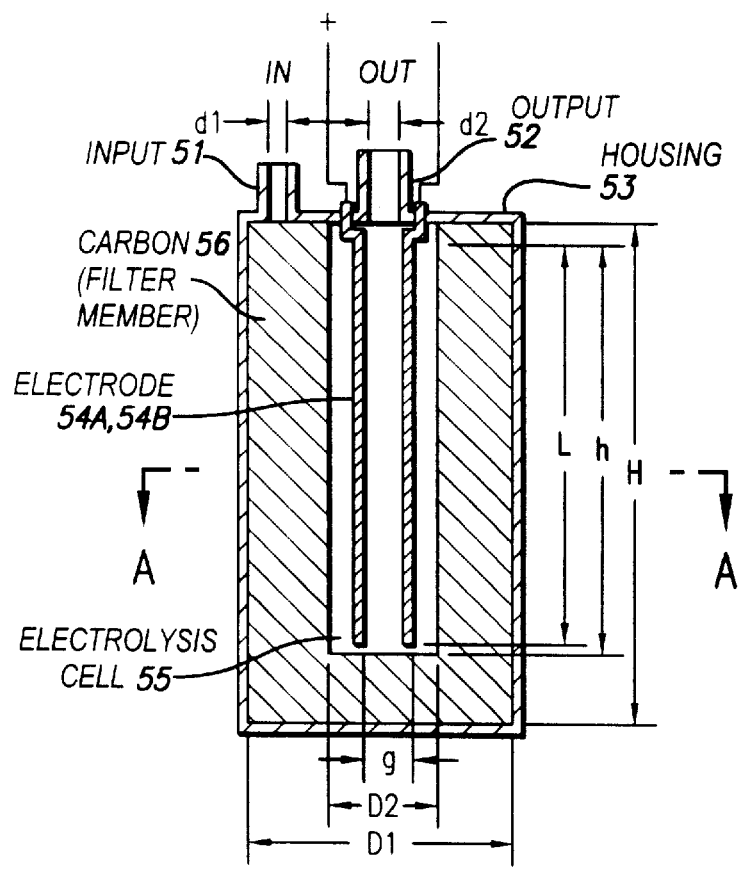
FIG. 13B
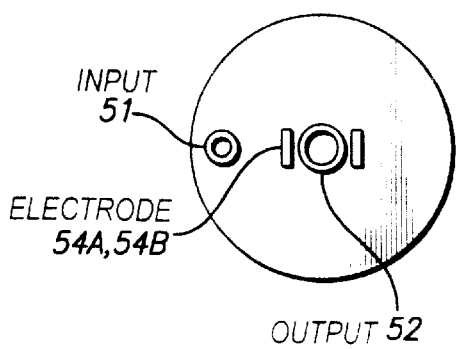
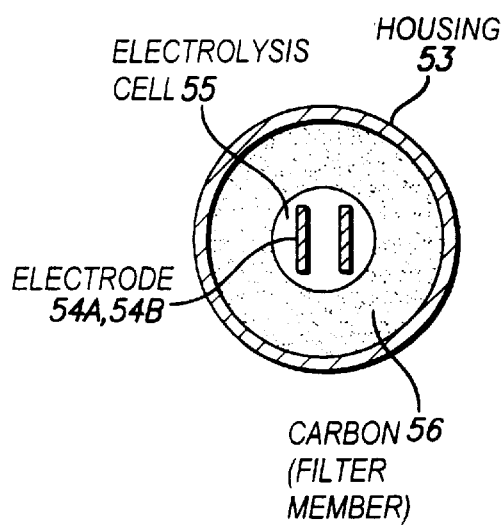
FIG. 13C

WATER PURIFYING AND DISPENSING APPARATUS, AND METHOD OF PURIFYING CHLORINE-CONTAINING WATER

FIELD OF THE INVENTION

The present invention relates to a drinking water feeding apparatus having a sterilizing function in an automatic vendor, a beverage dispenser, a water cooler, an ice maker or a home water purifier. The invention also relates to a chlorine generator to be used in the drinking water feeding apparatus.

BACKGROUND OF THE INVENTION

Service water fed to a drinking water feeding apparatus typically may have a chlorine smell or a muddiness and a rust from the piping. If a beverage (e.g. soft drink or coffee) is dispensed using service water as provided, its intrinsic taste or flavor may be unacceptable. In order to satisfy the water quality standards based on the service water regulations, a filter is frequently used. Such filters must have a filtering function, a dechlorinating function and the ability to remove perceived muddiness. Most filters are troubled by bacterial contamination. Carbon type filters are frequently used for drinking water. They have excellent filtering, dechlorinating and muddiness-removing abilities, but the filtering material (carbon) deactivates the active chlorine contained in the service water, so that the filter loses its sterilizing and fungistatic abilities against the bacteria or the like which migrate into the service water.

Under circumstances in which no service water facilities are available, the service water is stored in a tank (cassette tank). In this system, however, it is difficult to keep either the cassette tank itself or the reserved water of the cassette tank which is in contact with the atmosphere in a sanitary state. Furthermore, the filtering material typically has to be replaced when the quantity of the water which has been filtered exceeds a predetermined maximum value. During filter replacement, aerobacteria can migrate into the filter.

Thus, there arises a problem that the inside and the downstream of the filter become hotbeds for the growth of various bacteria. When bacteria are present in concentrations of 15 MPN/100 ml in the service water, for example, they can propagate to concentrations of up to $3.9 \times 10^3$ cfu/ml after being left for one day at the ambient temperature of 30° C., in a filter container of 1 L containing 390 ml activated charcoal, with an 80 ml collecting pipe and 340 ml water in a filter cartridge.

For this reason, methods have been devised to attempt to control the number of bacteria in the filter, in which carbon and a fibrous filter are combined to retain active chlorine. Thus, an effective quantity of active chlorine is fed to the downstream of the filter, providing a sterilizing effect. About one third of the total chlorine ion concentration present in typical feed water would be effective for removing bacteria, but the method is not expected to be sufficiently effective for locations where the chlorine concentration contained in the service water is low or for the service water in which most of the active chlorine is effectively deactivated.

In order to avoid drinking water contamination by the bacteria, a drinking water feeding apparatus is disclosed in Unexamined Published Japanese Patent Application No. 9-1149. This reference discloses a closed-type drinking water feeding apparatus which is constructed to isolate the drinking water pipelines from the atmosphere, thereby preventing possible contamination by aerobacteria. Also inherent in Unexamined Published Japanese Published Japanese Patent Application No. 9-1149, is the difficulty that while air can be removed upstream of the chlorine generator, it cannot be removed from the passage downstream of the chlorine generator. Moreover, as drinking water is electrolyzed in the chlorine generator, oxygen or other gases are generated at the positive electrode, and hydrogen gas is generated at the negative electrode. The generation of these gases leads to a reduction in the electrolysis efficiency of the chlorine generator, such that a desired chlorine concentration necessary for sterilization cannot be achieved. This apparatus generates active chlorine by causing electrodes to contact drinking water as it is fed through a filter and by electrolyzing the drinking water so that the drinking water is sterilized by active chlorine. In order to maintain levels of active chlorine sufficient for sterilization purposes, it was found necessary to elongate the electrode surfaces in the flow stream or, alternatively, to reduce the flow speed of the drinking water through the apparatus. There are several drawbacks to this approach however. An elongation of the electrodes inevitably enlarges the apparatus because the elongated electrodes cannot be accommodated in the limited space of a standard beverage dispenser. Furthermore, reducing the feed rate of the service water unduly limits the dispensing rate of the drinking water.

Another way to generate active chlorine in effective sterilizing concentrations without changing the size of the electrodes or reducing the water flow speed, is to increase the electric current to be applied. In this case, however, as the current density rises, electrode consumption accelerates. In an attempt to minimize consumption of electrodes, therefore, the current value has to be suppressed and the problem arises that a predetermined uniform chlorine concentration value (e. g., 0.2 ppm) cannot be achieved for the drinking water for all the geographic areas having different water qualities. Specifically, the desired chlorine concentration depends mainly on the two parameters: the quality (especially, conductivity and chlorine ion concentration) of water to be electrolyzed; and an "ON" time period. If the electrodes cannot be enlarged and if the "ON" time period (that is, the time period for the drinking water to pass the length of the electrode surface) cannot be lengthened, the predetermined chlorine concentration may not be attained for all potential water qualities.

Unexamined Published Japanese Patent Application No. 59-150950 discloses a filter in which electrodes for the electrolysis are packaged to give the sterilizing effect. This filter kills bacteria adsorbed by the activated charcoal or suppresses their propagation by providing a chlorine generator to feed the activated charcoal with active chlorine generated by service water electrolysis. As a result, the active chlorine concentration can be reduced by the activated charcoal after the sterilization to provide sterilized water having minimal chlorine smell.

In this arrangement however, the active chlorine generated by the chlorine generator mounted therein only affects bacteria absorbed by the activated charcoal without being fed downstream. When the drinking water feed is interrupted and the drinking water resides downstream, then bacteria can propagate.

Unexamined Published Japanese Patent Application No. 60-283391 and Japanese Patent No. 2564943 disclose drinking water feeding devices. In these references, drinking water such as the service water introduced from the water source and containing chlorine ions is electrolyzed to produce active chlorine having a sterilizing activity so that electrolyzed water may be fed as the drinking water. The drinking water feeding devices thus disclosed electrolyze service water to generate active chlorine and this service water is reserved in a cistern vented to the atmosphere, or in a water reservoir. However, the cistern vented to the atmosphere or the water reservoir is easily contaminated by aerobacteria. When the cistern is equipped with electrolyzing electrodes, on the other hand, the drinking water is fed intermittently, the feeding being determined by the water level, which is detected by a water level sensor. The chlorine concentration changes with the fluctuation of the quantity of water within the range of the difference between the highest water level and the lowest water level so that a constant concentration of active chlorine cannot be stably generated.

SUMMARY OF THE INVENTION

In one aspect, the present invention provides a drinking water feeding apparatus which can ensure a chlorine concentration necessary for sterilizing drinking water of various qualities with a simple construction.

In another aspect, the invention provides a drinking water feeding apparatus which can feed, even for long intervals between feeding of the drinking water, drinking water uncontaminated by bacteria.

In yet another aspect, the invention provides a filter having a chlorine generator packaged therein. This filter facilitates the reduction in size of a drinking water feeding apparatus, an icemaker or a home water purifier when packaged therein.

In a further aspect, the invention provides a drinking water feeding apparatus and a chlorine generator, which enables high electrolysis efficiency, by releasing any gases produced by electrolysis such as hydrogen and oxygen gas generated during electrolysis.

As used in the claims and specification, the term "active chlorine" refers to chlorine-containing molecules which have toxic activity against microorganisms, particularly bacteria, and refers specifically to those chlorine-containing molecules which are produced through electrolysis of chlorine-ion containing aqueous solutions. Such molecules include $Cl_2$, hypochlorous and hydrochloric acids, and species produced therefrom in aqueous solution.

As used in the claims and specification, the terms "service water" or "civil water" refers to water as supplied by municipal and other sources, commonly known as "tap water." The term "feed water" refers to filtered service water. The term "sales water" refers to electrolyzed feed water. The term "drinking water" is synonymous with "sales water."

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the present specification, including definitions, will control. In addition, the materials, methods and examples are illustrative only, and not intended to be limiting.

Other features and advantages of the invention will be apparent from the following detailed description, and from the claims.

BRIEF DESCRIPTION OF THE DRAWINGS

FIG. 4 is a timing chart illustrating the "ON" actions of the chlorine generator of a beverage dispenser.

FIG. 13(a) is a side view of a chlorine generator.

FIG. 13(b) is an overhead view of the chlorine generator shown in FIG. 13(a).

FIG. 13(c) is a cross-section taken along a portion A—A of FIG. 13(a).

DETAILED DESCRIPTION

Particular embodiments of a drinking water feeding apparatus of the invention are described in detail below, with reference to the accompanying drawings.

Figure 1:
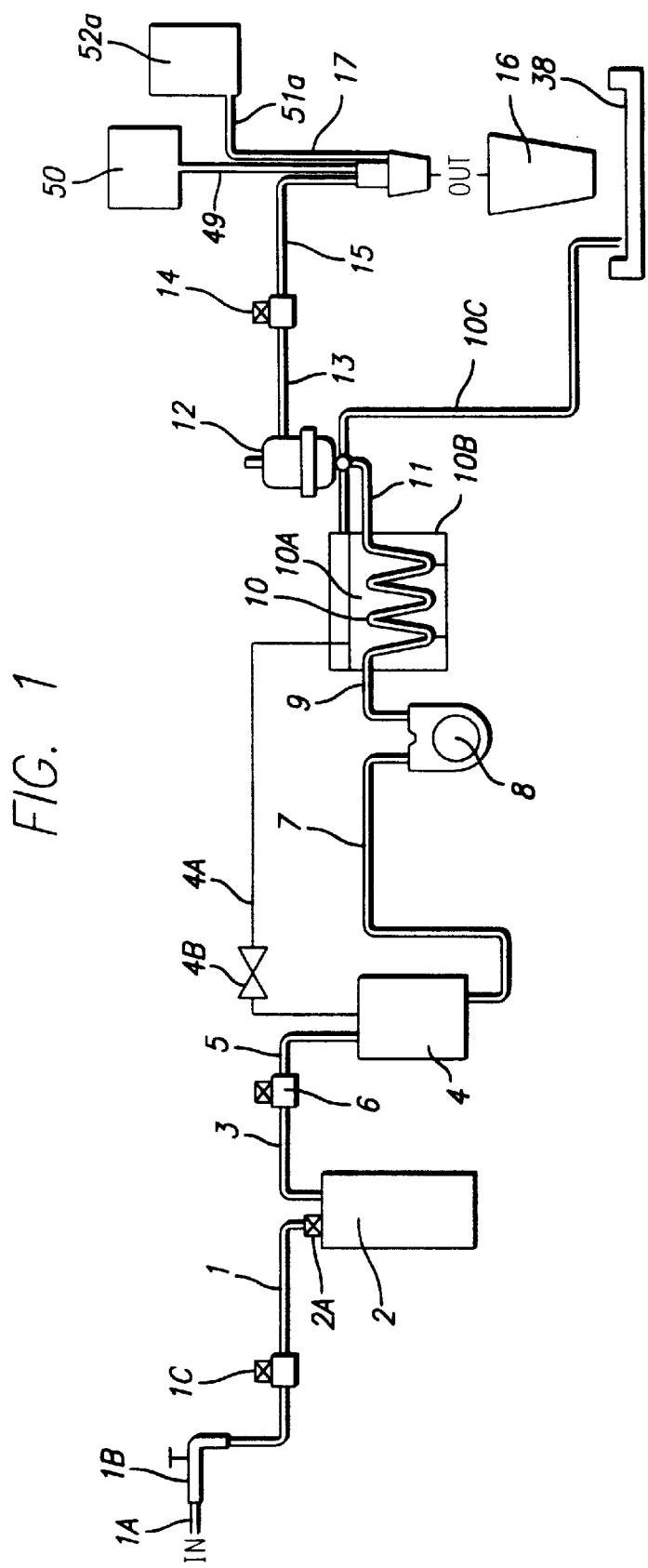
FIG. 1 is a beverage dispenser as a drinking water feeding apparatus.

FIG. 1 shows a beverage dispenser according to a first embodiment of the invention for vending beverages such as colas or juices. This beverage dispenser includes, beginning at the water inlet labeled "in": intake pipe 1 connected to service water faucet 1B attached to service water pipe 1A; intake valve 1C provided in intake pipe 1; water filter 2 connected to intake pipe 1 for filtering the service water to prepare filtered water ("feed water"); the chlorine generator 4 connected to water filter 2 via two pipelines, namely pipeline 3 and pipeline 5, as can be seen in FIG. 1; feed water electromagnetic valve 6 connected to chlorine generator 4 via feed pipeline 5; feed pump 8 connected to chlorine generator 4 and not directly to feed water electromagnetic valve 6; a temperature modification tube, such as cooling coil 10, connected to feed pump 8 via feed pipeline 9 for modifying the temperature of the sales water; a temperature modified reservoir, such as cooled water cell 10B, for reserving temperature modified water 10A which modifies the temperature of the sales water through cooling coil 10; flow regulator 12 connected to cooling coil 10 via feed pipeline 11 for controlling the sales water flow rate;

electromagnetic valve 14 connected to flow regulator 12 via feed pipeline 13; valve 17 connected to electromagnetic valve 14 via feed pipeline 15 for dispensing the sales water into cup 16; and drip tray 38 into which cooled water 10A having over-flown from cooled water cell 10B, is discharged via overflow water pipeline 10C. Into valve 17 can be introduced syrup from syrup feed pipeline 49 leading from syrup reservoir 50, and carbonated water from carbonated water pipeline 51a, leading from carbonator 52a, which are mixed in valve 17 so that the mixture can be dispensed as a carbonated beverage into cup 16. Suitable methods for providing acceptable qualities of syrup and carbonated water, including the methods described herein, can be employed. In this embodiment, sales water is used as a diluent for diluting the syrup and carbonated water.

Water filter 2 in this embodiment includes an activated charcoal filter having an activated charcoal filled layer as a filter member, and intake pipe 1 is provided with check valve 2A for preventing the back flow of the filtered water.

Feed pipelines 3, 5, 7, 9, 11, 13 and 15 are formed of material that facilitates the sterilization and provides simple and cost-effective installation and maintenance. Exemplary of such material is polyethylene, although one of skill in the art will readily be able to substitute other suitable materials. Cooling coil 10 is formed of a material having excellent heat transferring properties; such materials can be for example stainless steel, although a number of substitute materials are available. In particular embodiments, feed pipelines 3, 5, 7, 9, 11, 13 and 15 have an internal diameter of 4 mm, and cooling coil 10 has an internal diameter of 5.5 mm. The invention is in no way limited by specific dimensions of such parts. As indicated above, cooling coil 10 may serve equally well as a heating coil, with attendant modifications to components involved in temperature modification or stabilization, should sales water be desired at temperatures above ambient.

Chlorine generator 4 has a structure for reserving the feed water temporarily, and includes degassing pipe 4A for discharging any gases produced by electrolysis such as hydrogen and oxygen gas. Chlorine generator 4 also includes a gas release valve, for example electromagnetic degassing valve 4B, disposed in a gas conduit, such as degassing pipe 4A, so that the steam- or vapor-containing gases produced upon electrolysis are discharged via degassing pipe 4A into cooled water 10A whenever degassing valve 4B is opened. The gas-liquid mixture to be released together with the electrolyzed gas from chlorine generator 4 may be discharged not only into cooled water cell 10B, such as at a point below the surface of the cooled water, but also into a liquid in a waste liquid bucket or into drip tray 38.

Table 1: according to the description, the chlorine generator has the reference numeral 4, wherein the electrolysis cell has the reference numeral 40. As table 1, $2^{nd}$ to $4^{th}$ lines, also refer to the electrolysis cell, reference numeral 4 should be corrected to read reference numeral 40.

TABLE 1

Volume of Beverage Dispenser Sections (FIG. 1)

| Section of dispenser | actual section of beverage dispenser | Volume of Section (cc) |
|---|---|---|
| feed pipeline 5 | end of valve 6 to start of cell 4 | 15 |
| electrolysis cell 4 | entire cell | 152 |
| feed pipeline 7 | end of cell 4 to start of pump 8 | 15 |

TABLE 1-continued

Volume of Beverage Dispenser Sections (FIG. 1)

| Section of dispenser | actual section of beverage dispenser | Volume of Section (cc) |
|---|---|---|
| feed pipeline 9 | end of pump 8 to start of coil 10 | 33 |
| cooling coil 10 | entire coil | 362 |
| feed pipeline 11 | end to coil 10 to start of regulator 12 | 8 |
| feed pipeline 13 | end of regulator 12 to start of valve 14 | 8 |
| feed pipeline 15 | end of valve 14 to valve 17 | 4 |
| total | | 597 |

Figures 2A, 2B:
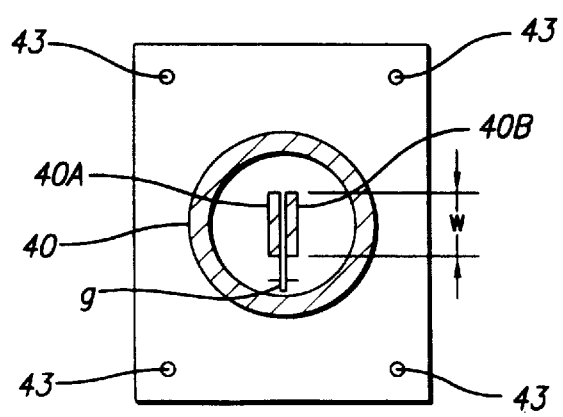
FIG. 2(a) is a side view of a chlorine generator.
FIG. 2(b) is a section taken along a portion A–A of FIG. 2(a).

FIG. 2(a) shows chlorine generator 4 which can be used in a particular embodiments of the invention. Chlorine generator 4 includes: an electrolysis cell 40 equipped therein with electrolyzing electrodes 40A and 40B which are electrically connected with constant current unit 47 as a power source; cover members 41A and 41B for isolating electrolysis cell 40 from the atmosphere by sealing its end portions; bolts 43 fitted through cover members 41A and 41B; and nuts 42 screwed on bolts 43 for fixing cover members 41A and 41B on the two ends of electrolysis cell 40; degassing pipe 4A for discharging gases produced by electrolysis such as hydrogen and oxygen gas; and electromagnetic degassing valve disposed in the degassing pipe 4A (shown as 4B in FIG. 1), so that vapor is discharged via degassing pipe 4A as the degassing valve is opened. This degassing valve is exemplified by a ball-type check valve which is opened when the pressure in electrolysis cell 40 is greater than the weight of the ball. In preferred embodiments of the invention, a degassing valve is operated by a timer is used, as described below.

As described before, feed pipelines 5 and 7 have an internal diameter of 4 mm. Thus, a cross-sectional area of feed pipelines 5 and 7 is 12.56 mm$^2$. On the other hand, electrolysis cell 40 has an internal diameter of 40 mm in this preferred embodiment. Thus, the cross-sectional area of electrolysis cell 40 is 1256 mm$^2$.

For instance, when the untreated water is supplied via feed pipeline 5 to electrolysis cell 40 at a flow velocity of 3.78 m/sec, and the purified water is supplied from electrolysis cell 40 to feed pipeline 7 at the same flow velocity, a flow velocity of water to be electrolyzed in electrolysis cell 40 is 0.0378 in/sec in accordance with the below calculation based on a ratio of the cross-sectional areas.

$$0.0378 \text{ m/sec} = 3.78 \text{ m/sec} \times (12.56 \text{ mm}^2/1256 \text{ mm}^2)$$

The flow velocity of the water is negligible to provide substantially stationary water in electrolysis cell 40, while the untreated water and the purified water flow through feed pipelines 5 and 7 to ensure a practical dispensing rate of the drinking water without any elongation of electrolysis electrodes and any increase of electrolyzing current.

Even with the provision of the described degassing mechanism, about 80% or more of the evolved gas flows downstream from the container of the chlorine generator 4. In order to reduce the gas outflow, it can be desirable to introduce a separating filter in a gas purge region so that the gas phase and the liquid phase may be separated to more effectively discharge the gas. A flow changing member can be provided in the vicinity of the connecting portion between feed pipeline 7 on the discharge side of chlorine generator 4 and electrolyzing cell 40b for example, by forming chlorine generator 4 into a bulging shape. Alternately, by staggering feed pipeline 5 extending into chlorine generator 4 and the feed pipeline 7 extending from the chlorine generator 4, turbulence can be established in the water flow in the electrolysis cell. Specifically, the structure is desirably constructed so that the gases generated by the electrolysis are not directly introduced into feed pipeline 7 extending from chlorine generator 4 at a lower pressure. Moreover, there may be a baffle or similar element provided in the container for altering the liquid flow as desired to minimize the introduction of gas into the sales water.

The chlorine generator thus far described can maintain a predetermined chlorine concentration reliably by releasing the gases produced by electrolysis such as hydrogen and oxygen gas. The chlorine generator acts as an effective sterilizing member when packaged in the drinking water feeding apparatus such as the automatic vendor, beverage dispenser, water cooler, ice maker or home water purifier.

In particular embodiments of the invention, electrolysis cell 40 has an external diameter dl of 43 mm, a height h of 130 mm and an internal diameter d2 of 40 mm, and of 152 cc. The invention is not limited by specific dimensions of such parts. In an alternate embodiment, electrolysis cell 40 and cover member 41A or 41B may be integrated with each other. The cover member with joint 41a for feed pipeline 5 and joint 41b for degassing pipe 4A. Cover member 41B is equipped with joint 41c for feed pipeline 7.

FIG. 2(b) is a cross-section of a portion A—A of FIG. 2(a). Electrolysis cell 40 is equipped with paired electrodes 40A and 40B which are made of suitable electrode material (for example, titanium coated with an alloy of platinum). Electrode 40A acts as a positive pole and electrode 40B acts as a negative pole. Electrodes 40A and 40B are preferably operated by periodically alternating them as positive and negative poles so that their complete depletion may be postponed. In particular embodiments, electrodes 40A and 40B are formed to have width w of 36 mm and to be separated by electrode gap g of 3 mm and are disposed in electrolysis cell 40 that they contact the reserved water of the electrolysis cell 40 at their front and rear faces. That is, they may be immersed in the reserved water. In this case, electrodes 40A and 40B have a submerged length of about 120 mm. However, the invention is in no way limited by specific dimensions of such parts.

In a preferred embodiment, the feed water is introduced into electrolysis cell 40 at the start of the sales water vending operation and is reserved therein for subsequent electrolysis. The beverage dispenser according to this embodiment of the invention is characterized in that it provides an electrode "ON" time period necessary for establishing an effective chlorine concentration. As a result, the time period for energizing electrodes 40A and 40B can be arbitrarily set according to the water qualities of any particular region. Further, the electrodes can be activated to provide an effective chlorine concentration at times other than upon vending. In contrast, a beverage dispenser which electrolyzes the feed water only at the start of the sales water vending operation will only perform electrolysis during the vending operation. This method of operation is inferior because it cannot maintain the chlorine concentration which may be required for some water qualities.

The duration of the "ON" time period is determined by the quality of the water location is ascertained by measuring the chlorine concentration ($C_m$) by performing electrolysis for an arbitrary time period ($T_m$) at the time of installation of the beverage dispenser. The optimum "ON" time period ($T_s$) to be set is deduced from the following equation expressing a relationship between the measured chlorine concentration ($C_m$) and a desired chlorine concentration ($C_s$):

$$\text{"ON" Time Period } (T_s) = (T_m) \times (C_s)/(C_m) \qquad \text{Eq. 1}$$

If for example, electrodes 40A and 40B are energized with a constant current (e.g., 800 mA), and electrolysis is performed for a $T_m$ of 5 seconds, and the chlorine concentration (Cm) obtained for that time period is 0.5 ppm, it follows that an "ON" time period of 7 seconds will be necessary to give a chlorine concentration of 0.7 ppm, and that an "ON" time period of 5 seconds is necessary for a chlorine concentration of 0.5 ppm. This current value 800 mA is arbitrarily selected according to the size of the electrodes, as determined by the design of the chlorine generator, and may take a different value taking into account the consumption of the electrodes. One of skill in the art will readily be able to determine appropriate current and electrolysis time values for the achievement of these goals.

When a current of 800 mA is fed for the size of the electrodes 40A and 40B as given in FIG. 2, the current density reaches a value of about 1.85 A/cm². If the current density exceeds 2.00 A/cm², however, the electrodes are found to be heavily eroded.

Figure 3:
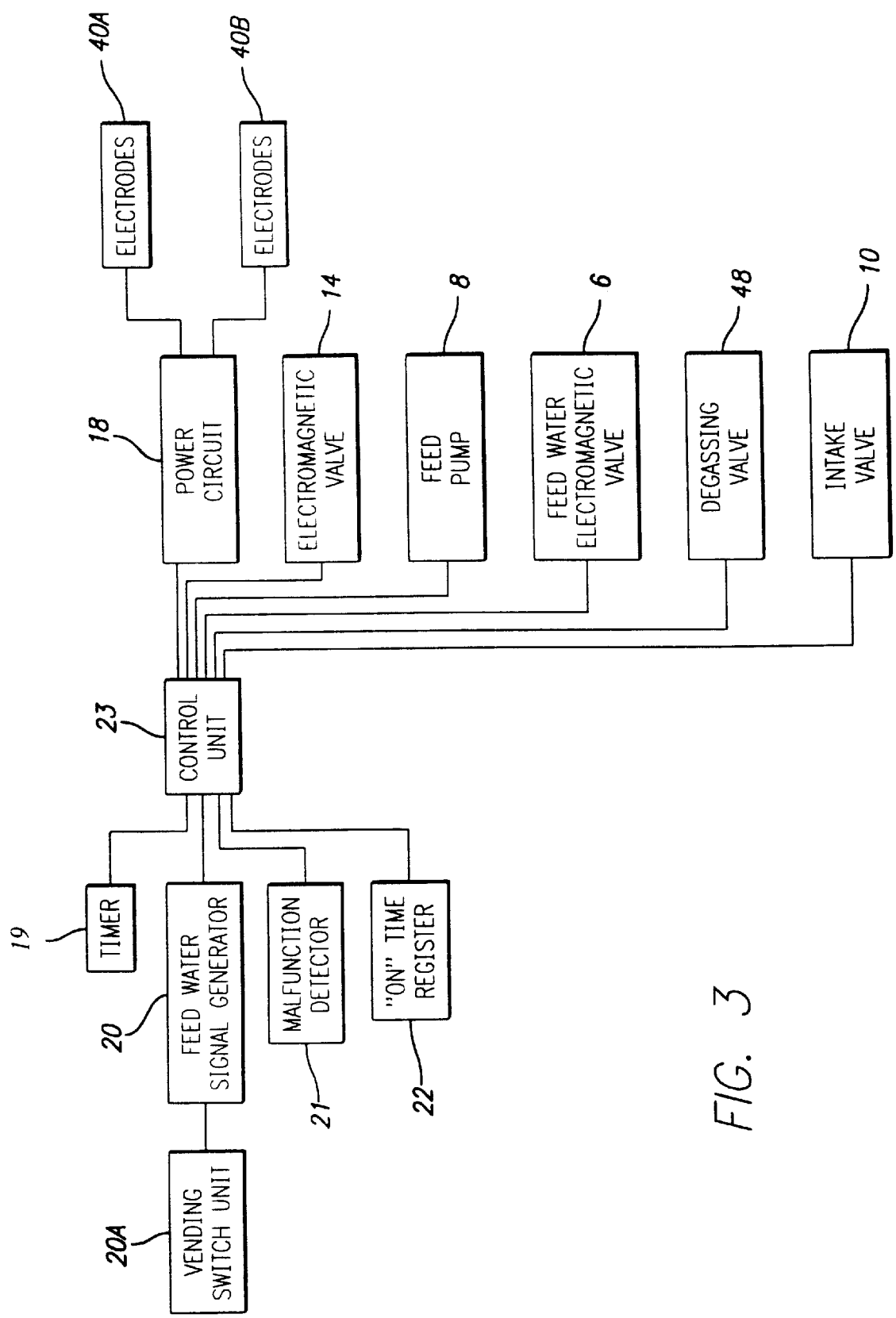
FIG. 3 is a control block diagram of the beverage dispenser.

FIG. 3 shows a control block of the beverage dispenser according to a first embodiment of the invention. This control block includes: power circuit 18 for applying a DC voltage to electrodes 40A and 40B; timer 19 for setting the ON/OFF time of power circuit 18 and metering the time period from the feed water end; feed water signal generator 20 for generating a feed water signal when vending switch unit 20A is operated to input feed water command $P_1$; malfunction detector 21 for generating an "ON" stop signal in case of a disaster such as earthquake or a malfunction such as a water failure; "ON" time register 22 for metering the "ON" time period to store an accumulation time; and control unit 23 for controlling power circuit 18, feed water electromagnetic valve 6, feed pump 8, degassing valve 4B, electromagnetic valve 14 and intake valve IC.

FIG. 4 is a timing chart illustrating "ON" operations of chlorine generator 4, and the operations of the drinking water feeding apparatus of the invention will be described with reference to the timing chart. When the feed water signal based on the feed water command $P_1$ is input at an instant to from feed water signal generator 20 to control unit 23, intake valve IC, feed water electromagnetic valve 6 and electromagnetic valve 14 are turned on, and feed pump 8 is driven so that the service water is fed to water filter 2 from intake pipe 1 connected to service water faucet 1B and is filtered by filter 2. In a particular embodiment of the invention, the feed time period of the service water is 5 seconds, and the quantity of feed is 150 cc. The filtered feed water is fed via feed pipeline 3 by the service water pressure and is reserved in chlorine generator 4. On the other hand, according to particular embodiments of the invention, power circuit 18 energizes electrodes 40A and 40B for 7 seconds when it receives a drive signal $S_1$ from control unit 23.

When the current of 800 mA is fed to electrodes 40A and 40B under the condition of a current density of 1.85 A/dm², for example, sales water containing an active chlorine concentration of 0.7 ppm is generated by energizing the electric current for 7 seconds for the service water of a region having a chlorine ion concentration of 25 ppm and a conductivity of 250 $(\Omega \cdot \text{cm})^{-1}$ or for 4 seconds for the service water of a region having a chlorine ion concentration of 45 ppm and a conductivity of 300 $(\Omega \cdot \text{cm})^{-1}$. Many regions have water falling within a chlorine ion concentration of 5 to 50 ppm and a conductivity of 50 to 500 $(\Omega \cdot cm)^{-1}$. Since a predetermined quantity of water is thus reserved in electrolysis cell 40, the electrolysis can be prolonged, if necessary, even after lapse of the 5 seconds vending time period, so that a constant chlorine concentration can be achieved by performing the electrolysis determined by the water qualities of a wide variety of regions without enlarging the electrodes.

By energizing electrodes 40A and 40B in chlorine generator 4, chloride ions Cl⁻ are released from positive electrode 40A immersed in the service water, so that active chlorine $Cl_2$ is generated and dissolved in the service water to generate sales water containing active chlorine at a concentration of 0.7 ppm. Since the solubility of chlorine in 100 g of water (10° C.) is 0.9972 g, active chlorine can be largely dissolved in the sales water so that the sales water has a sterilizing activity.

Besides active chlorine, oxygen gas is also generated at positive electrode 40A, and hydrogen gas is generated at negative electrode 40B. Most of these gases produced by electrolysis are reserved in chlorine generator 4 which also contains a minute quantity of steam. After several electrolyses the quantity of residual gas increases. The resulting gas pressure depresses the liquid surface in electrolysis cell 40. Then, the contact area between electrodes 40A and 40B and the reserved water decreases. The current density subsequently rises to over 2.00 A/cm2, and the burden on the electrodes is increased.

To counteract this effect, the beverage dispenser according to this embodiment is able to record and store a total accumulation of the "ON" time periods of electrodes 40A and 40B in "ON" time register 22. Also, a gas release control aspect of control unit 23 controls degassing valve 4B, causing it to open when the time accumulation of "ON" time periods reaches a predetermined value. When the accumulated "ON" time period reaches a predetermined value, for example 150 seconds, control unit 23 outputs degassing signal $P_n$. By opening degassing valve 4B on the basis of the input of the degassing signal, control unit 23 discharges the gas produced by electrolysis into cooled water cell 10B via degassing pipe 4A. The accumulated time period of "ON" time register 22 is desirably set that the gases produced by electrolysis are released when the water level in electrolysis cell 40 is lowered by increased gas pressure by about 5 mm as the electrolysis proceeds. If the water level drop in electrolysis cell 40 is about 5 mm, the current density of the particular electrode arrangement described herein is about 1.93 A/dm² at the highest and will not exceed the upper limit of 2.00 A/dm² so that electrodes 40A and 40B are not excessively consumed. One of skill in the art will be able to adjust the predetermined maximum time between degassing signals on the basis of a particular electrode configuration, and chlorine generator configuration. After venting, control unit 23 shuts degassing valve 4B, and clears the accumulated time period from "ON" time register 22.

Degassing valve 4B may be additionally opened by control unit 23 for 5 to 10 seconds once a day, independently of the accumulated "ON" time period. A timer associated with control unit 23 can record the accumulated time since the valve was last opened and send a signal to the degassing valve when this accumulated time reaches a predetermined maximum value. Even if aerobacteria migrate into the electrolysis cell, they are subjected to a sterilizing or fungistatic treatment with the active chlorine in the closed container.

The chlorine-containing sales water is fed via feed pipeline 7, feed pump 8 and feed pipeline 9 to cooling coil 10 so that it is cooled while passing through cooling coil 10. The sales water thus cooled through cooling coil 10 is dispensed from valve 17 into cup 6 via feed pipeline 11, flow regulator 12, feed pipeline 13, electromagnetic valve 14 and feed pipeline 15. As mentioned above, sales water can also be provided at temperatures above ambient, by adapting the cooling coil, cooled water cell and other relevant parts of the dispensing apparatus, to handle warmed sales water.

Timer 19 starts its timing action from feed water shut off time $t_1'$ of the sales water. Referring again to FIG. 4, in response to a new feed water command $P_2$ at timing instant $t_2$, timer 19 stops its timing action to reset the timing data. In response to this feed water command, control unit 23 outputs drive signal $S_2$ to power circuit 18 so that electrodes 40A and 40B are energized for 7 seconds to electrolyze the feed water. On the other hand, timer 19 outputs a time-up signal to control unit 23 at an instant $t_n$ if no feed water signal has been produced for a predetermined maximum dormancy time period (e.g., 4 hours), counted from feed water ending instant $t_2'$. In response to the time-up signal from the timer 19, the control unit 23 outputs drive signal $S_n$ to power circuit 18 so that electrodes 40A and 40B are energized for 7 seconds to electrolyze the feed water.

The beverage dispenser provides for the opening of electromagnetic degassing valve 4B on the basis of the accumulated value stored in "ON" time register 22. However, electromagnetic degassing valve 4B may be replaced by a ball type check valve which is opened when the pressure in electrolysis cell 40 exceeds the weight of the ball. Thus, the gas-liquid mixture, discharged together with the gases produced by electrolysis from chlorine generator 4, can be properly treated while preventing a rise in internal pressure of chlorine generator 4. As a result, the water in chlorine generator 4 can be kept at a constant level even without any water level sensor. Therefore, the deterioration of the electrolyzing efficiency, which might otherwise be caused by the gases produced by electrolysis is inhibited.

Since beverage dispenser is sealed from the atmosphere in all its feed pipelines including chlorine generator 4, there is a danger that it may expand and explode if the gases produced by electrolysis are not timely released from degassing valve 4B. For safety reasons, therefore, the feed pipe line system is preferably equipped with a safety valve or the like which has a diaphragm or a breakable member for releasing gases when the residual gases produced by electrolysis reach some maximum allowable pressure. It is considered desirable that the gas release valve be activated to the extent needed to maintain a slightly positive gas pressure within the air-shielded container, so that foreign agents, including microorganisms, are not introduced upon opening the container. The beverage dispenser thus far described is equipped with a degassing mechanism in the electrolysis cell 40 of the chlorine generator. The degassing mechanism is not limited to this description, but can be equipped with a degassing electromagnetic valve or ball type check valve in the feed pipeline downstream of the chlorine generator.

In order to effectively retain active chlorine generated by the chlorine generator, the valve for vending the sales water and the connecting pipeline to the chlorine generator are preferably adapted to contain at least one sales water feed. In such an arrangement, the sales water, containing active chlorine generated by electrolysis, resides in the connecting pipeline. When the interval between vending operations is lengthy, thereby lengthening intervals between electrolyses, contamination sets in only upstream, near the water source so that the sales water having a relatively high chlorine concentration, and remaining uncontaminated, can be fed in a subsequent vending operation. Considering that active chlorine contained in the sales water is more readily solubilized and stabilized at lower water temperature, a cooling coil is preferably disposed in that connecting pipeline for cooling the sales water.

According to the beverage dispenser thus far described, feed water is fed to the chlorine generator 4 in a quantity according to the quantity (about 150 cc) of the vended sales water. This quantity of feed water is reserved in chlorine generator 4 each time the sales water is fed to the cup on the basis of the feed water command. As a result, feed water in a regular quantity of one cup is electrolyzed in the chlorine generator 4. In a preferred embodiment, electrodes 40A and 40B of chlorine generator 4 are energized simultaneously with the start of sales water vending. Specifically, electrodes 40A and 40B can be energized in response to the water feed command, and feed pump 8 may be driven one second later to vend the sales water.

Some beverage dispensers are provided with buttons for selecting individual cup sizes such as small (150 cc), medium (200 cc) and large (300 cc) so that the quantity of beverage to be vended can be selected by operating any of the select buttons. In preferred embodiments of a beverage dispenser according to the invention, cup size selection buttons are mounted in vending switch unit 20A so that control unit 23 controls the sales of the beverage according to the selected cup size and changes the "ON" time period according to the sales when it receives the feed water command $P_1$ indicating the cup size from vending switch unit 20A. When the aforementioned "ON" time period of 7 seconds is that for the vending time of the S size, for example, control unit 23 calculates the "ON" time periods of the vending time of the other sizes to control the energization of electrodes on the basis of the "ON" time period of the small size if the sales of medium or large size is selected. In preferred embodiments, the volume of water contained within the chlorine generator is approximately the same as the largest of volumes anticipated as being dispensed in a beverage dispenser.

On the other hand, some beverage dispensers are provided with a consecutive vending button for executing continuous sales of the sales beverage while that button is continuously operated. In this case, control unit 23 controls the continuous or interrupted energization of the electrodes with a current of 800 mA while the continuous vending button is depressed. In the continuous sales made of operation, the "ON" time period is not fixed but selected for maintaining a predetermined chlorine concentration by operating the electrodes continuously or interruptedly during the consecutive operation of the vending button on the basis of the fact that the "ON" time period for vending the small size is 7 seconds.

Chlorine generator 4 container is preferably made of a material which would minimize any changes in chlorine concentration of the sales water residing in the feed pipelines. Suitable construction materials are either a polyethylene tube or a resin of a fluorine containing resin, i.e., a resin material having fewer hydroxyl or hydrogen groups which are made less reactive with active chlorine, or a resin material not containing either group. As a result, the self-decomposition of active chlorine in the sales water can be suppressed, inhibiting the reduction in chlorine concentration, and improving the taste and flavor of the water, and products made with it. Further, the propagation of various bacteria can be minimized, keeping the feed pipelines sanitary for extended periods.

It is observed that the loss of active chlorine in aqueous solutions is slowed by the cooling action of the cooling coil. Moreover, it is preferable to adjust the "ON" time period by detecting the temperature of the feed water by means of a sensor or the like.

Figure 5A:
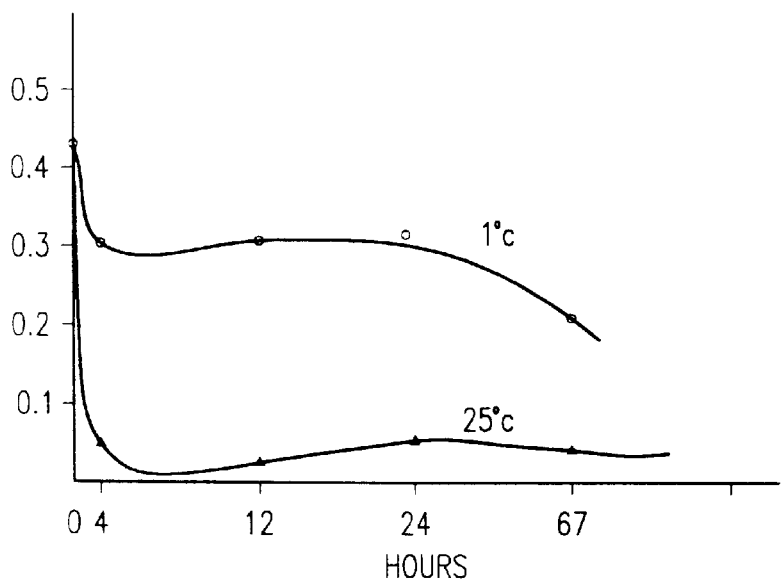
FIG. 5(a) is a plot of the aging of the quantities of active chlorine contained in the sales water.
Figure 5B:
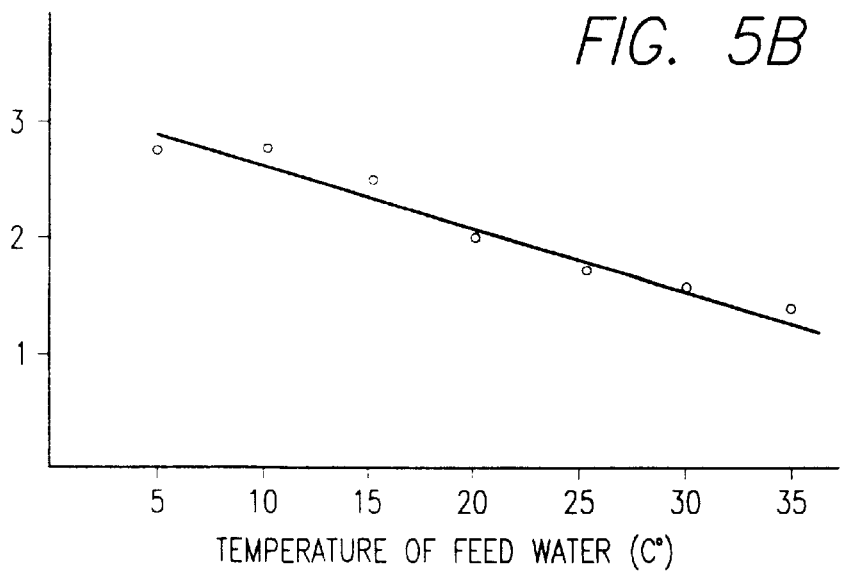
FIG. 5(b) is a plot of the relationship between the active chlorine generating efficiency of the sales water and the water temperature.

FIG. 5(*a*) plots the concentration of active chlorine in sales water versus time at water temperatures of 25° C. and 1° C. At 25° C., the concentration of active chlorine is drastically reduced with time, whereas at 1° C., the loss of active chlorine is less.

FIG. 5(*b*) plots the relationship between the active chlorine generating efficiency and the water temperature of feed water in chlorine generator 4. The active chlorine generating efficiency becomes higher for lower water temperature so that the deactivation of the active chlorine is less for lower water temperature. This means that the "ON" time period can be shortened if the water temperature is sufficiently low.

Figure 6:
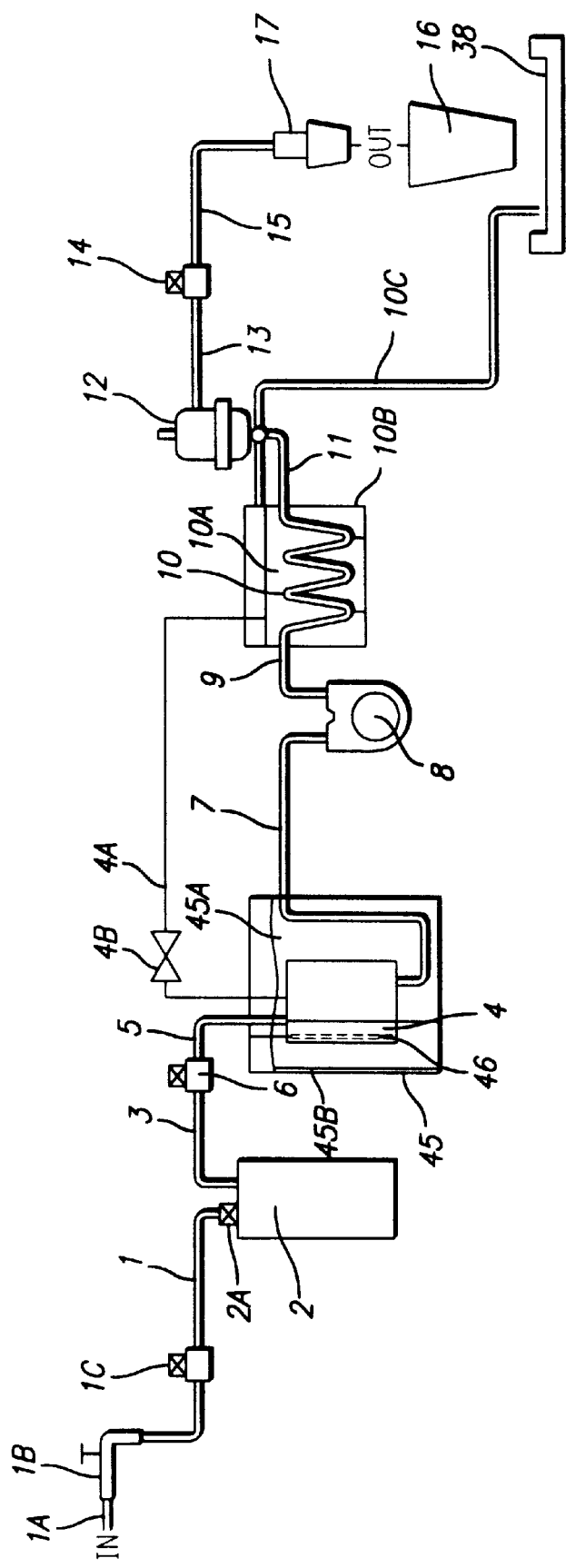
FIG. 6 is a beverage dispenser as a drinking water feeding apparatus.

FIG. 6 shows a beverage dispenser serving as a drinking water feeding apparatus according to a second embodiment of the invention. This beverage dispenser includes: cooled water cell 45 for reserving cooled water 45A; chlorine generator 4 immersed in cooled water 45A; service water temperature detecting sensor 46 for detecting the water temperature of the service water or the feed water fed to chlorine generator 4; and cooled water temperature detecting sensor 45B for detecting the water temperature of cooled water 45A. Cooled water 45A is cooled to a predetermined temperature by a cooler. If warmed water is instead desired, The remaining construction is identical to that of the beverage dispenser of the first embodiment shown in FIG. 1.

Figure 7A:
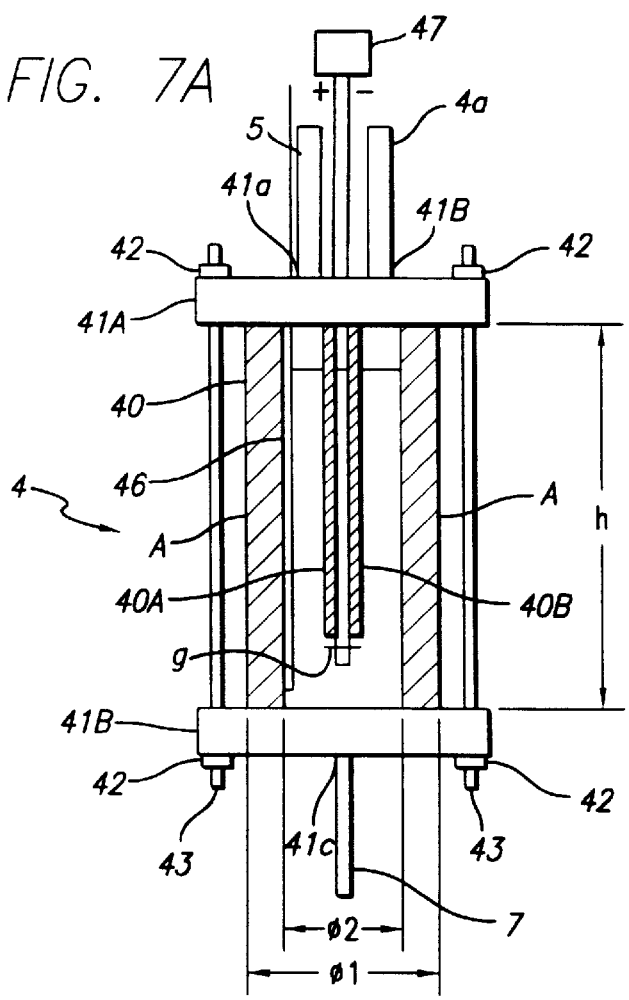
FIG. 7(a) is a side view of a chlorine generator.
Figure 7B:
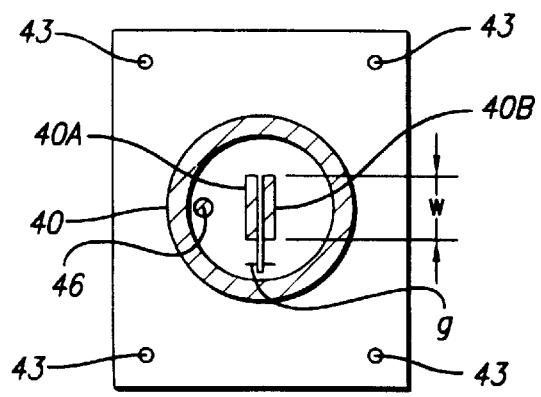
FIG. 7(b) is a cross-section taken along a portion A–A of FIG. 7(a).

FIG. 7(*a*) shows chlorine generator 4 according to a second embodiment of the invention. Electrodes 40A and 40B are electrically connected to constant current source 47 as a power source in which electrode 40A has a positive polarity and electrode 40B has a negative polarity, although regular polarity reversal is anticipated for best usage of the electrode material. The electrolysis cell is equipped with service water temperature detecting sensor 46 for outputting a detection signal according to the water temperature of the service water to the service water temperature detecting unit. On the other hand, cooled water temperature detecting sensor 45B shown schematically in FIG. 8 outputs a detection signal according to the water temperature of the cooled water to the cooled water temperature detecting unit. The remaining construction is identical to that shown in FIG. 2(*a*).

FIG. 7(*b*) is a cross-section taken across A—A of FIG. 7(*a*). Electrolysis cell 40 is equipped therein with paired electrodes 40A and 40B which are made of an alloy of titanium coated with platinum. These electrodes 40A and 40B are formed to have width w of 36 mm and spacing g of 3 mm and to contact the reserved water of electrolysis cell 40 on their front and back faces. That is, the electrodes 40A and 40B are immersed in the reserved water of electrolysis cell 40. Electrodes 40A and 40B are best operated by changing their positive and negative polarities at a predetermined "ON" time interval. Further, service water temperature detecting sensor 46 is arranged so as not to physically interfere with electrodes 40A and 40B.

Figure 8:
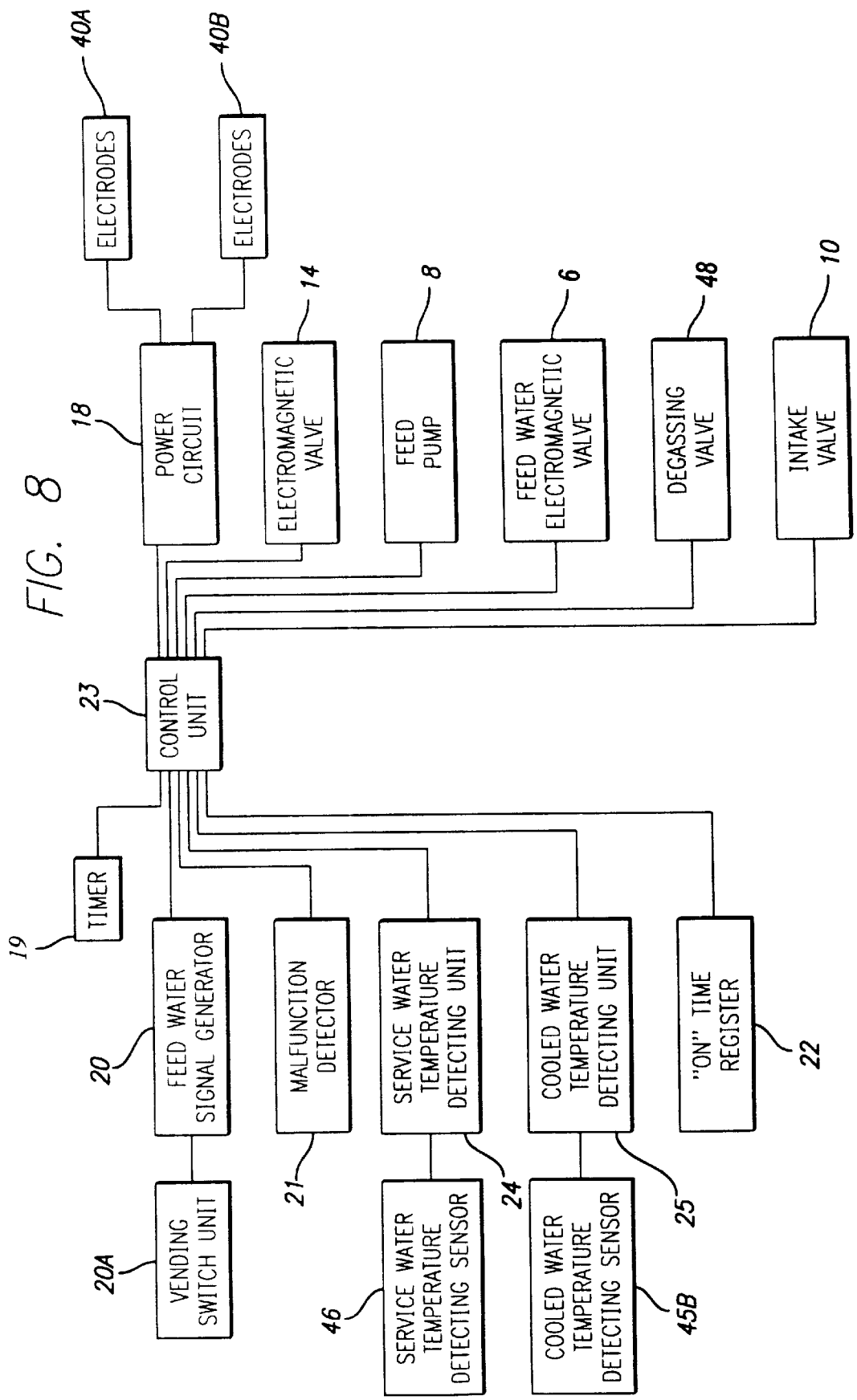
FIG. 8 is a control block diagram of the beverage dispenser.

FIG. 8 shows a control block of the beverage dispenser according to the second embodiment of the invention. This control block includes service water temperature detecting unit 24 for detecting the water temperature of the service water on the basis of the detection signal output from service water temperature detecting sensor 46. The control block also includes cooled water temperature detecting unit 25 for detecting the water temperature of the cooled water in the cooled water cell (or tank) on the basis of the detection signal outputted from cooled water temperature detecting sensor 45B. Control unit 23 includes a temperature difference-based control for providing an electrolysis signal based upon the difference between temperatures of the service water and cooled water in the cooled water tank, as reported by temperature detecting units 24 and 25. The result of such control is that water in the electrolysis cell will be electrolysed for a time which is dependent on this temperature difference, and in some preferred embodiments, is inversely dependent. The constructions and functions of the remaining components of the power circuit 18, timer 19, feed water signal generator 20, malfunction detector 21, "ON" time register 22 and control unit 23 are identical to those of the first embodiment shown in the control block diagram of FIG. 3.

Control unit 23 controls the electrolysis on the basis of the temperature difference between the temperature of the service water, as input from service water temperature detecting unit 24, and the temperature of the cooled water, as input from cooled water temperature detecting unit 25. The following specific description is based on the aforementioned small cup size (150 cc). The control is made such that the "ON" time period can be shorter than 7 seconds as the temperature difference increases, and can be longer than 7 seconds as the temperature difference decreases. This makes it possible to retain a constant chlorine concentration.

When chlorine generator 4 is cooled or when the sales beverage is cooled by the cooling coil or the like, chlorine-generating efficiency is improved so that deactivation of chlorine is suppressed by keeping the chlorine-containing sales water at a low temperature. Fluctuations in chlorine concentration are suppressed by controlling the electrolysis in chlorine generator 4 on the basis of the temperature difference between the service water and the cooled water. As a result, the sterilizing force of the sales water is maintained for an extended period.

On the other hand, the construction for feeding the syrups, to be mixed with the sales water from a Bag In Box (BIB) may be modified so that chlorine generator 4 is provided in the portion accommodating the BIB so that the chlorine generator is cooled together with the BIB.

Figure 9:
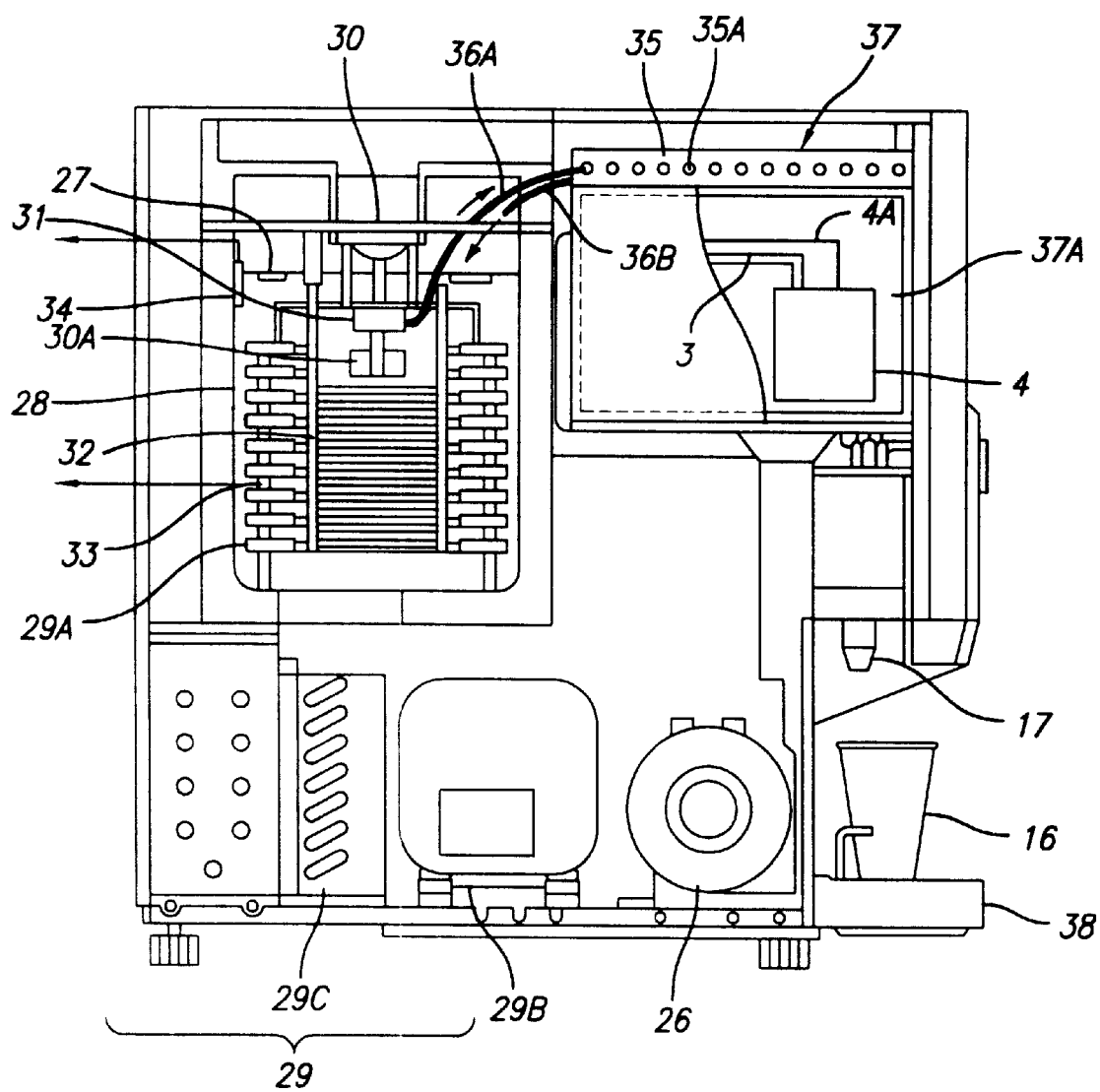
FIG. 9 is a beverage dispenser as a drinking water feeding apparatus.

FIG. 9 shows a beverage dispenser as the drinking water feeding apparatus according to a third embodiment of the invention. This beverage dispenser includes: pressure pump 26 for pressurizing and feeding the service water as the feed water to be fed from the civil water service pipe 1A; water cell 28 reserving cooled water 27; and cooling unit 29 for cooling cooled water 27 in water cell 28.

Cooling unit 29 includes: compressor 29B for compressing a coolant; condenser 29C for condensing the coolant; a condenser fan motor for providing a cooling air flow to condenser 29C; and evaporation pipe 29A made of copper for evaporating the coolant, which is condensed by condenser 29C, to cool the surroundings at the time of evaporation. The coolant can be any of a number of useful refrigeration coolants known and used by those of skill in the art. As mentioned herein, cooling unit 29 could be replaced by any number of heating units, should sales water be desirably provided at temperatures above ambient.

Water cell 28 includes: a carbonator (not-shown) for generating carbonated water by mixing the sales water and carbon dioxide; agitation motor 30 for agitating cooled water 27 by agitation propeller 30A; circulation pump 31 attached to agitation motor 30; coil unit 32 having a carbonated water coil for passing the carbonated water, and a sales water coil for passing the sales water; evaporation pipe 29A constructing cooling unit 29; IBC (Ice Bank Control) sensor 33 for outputting an ice detection signal on the basis of the change in the resistance by any ice produced between a pair of conductors on evaporation pipe 29A, and cell temperature sensor 34 for detecting the temperature of cooled water 27 in water cell 28. Circulation pump 31 and the entrance of cooled water pipeline 35A of cooler 35 are connected through cooled water pipe 36A, and cooled water pipe 36B returning to water cell 28 is connected to the exit of cooled water pipeline 35A of cooler 35. Bag-in-Box 37A in cold reserving cell 37 is kept cold by pumping cooled water 27 of water cell 28 via cold water pipe 36A to cold reserving cell 37 by the action of circulation pump 31, circulating it in cooled water pipeline 35A of cooler 35. Chlorine generator 4 is accommodated together with substantially the entire length of the feed pipelines from intake pipe 1 to feed pipeline 15, as connected to valve 17, in cold reserving cell 37.

In the beverage dispenser thus far described, substantially the entire length of the feed pipelines from intake pipe 1 to feed pipeline 15, as connected to valve 17, is cooled by cold reserving cell 5. As a result, the electrolyzing efficiency of the feed water by chlorine generator 4 is improved, while the deactivation of the active chlorine contained in the sales water is suppressed throughout the entire length of the feed pipelines in cold reserving cell 5. This makes it possible to keep the chlorine concentration in the feed pipelines at 0.2 ppm or higher, even when the sales water fed downstream of chlorine generator 4 resides for a long time in the feed pipelines to valve 17. It is also possible to sterilize the sales water while inhibiting the contamination of the inner walls of the feed pipelines with the bacteria or the propagation of the bacteria absorbed. Moreover, the active chlorine can be efficiently generated by prolonging the operational cycle of chlorine generator 4 when no feed water command is input for a long time.

In place of the aforementioned cold reserving cell, on the other hand, the construction may be made such that substantially the entire length of the feed pipelines is immersed in cooled water 27 to be reserved in water cell 28 and such that cooled water 27 is cooled by cooler 25. With this modification, it is possible to omit cooled water cell 10B for immersing cooling coil 10 therein.

To provide beverages according to consumer tastes, it is also possible to provide a source of flavoring, connected by piping to a mixer adapted to mix sales water from the water purifier apparatus, so that flavoring can be mixed with purified water in any desired ratio. A nozzle suitable for dispensing beverage into a cup or other container to be received by the consumer can also be present. As described above, carbon dioxide can also be provided for beverages desirably carbonated, preferably immediately before or upon dispensing.

The foregoing embodiment has been described with a beverage dispenser as the drinking water feeding apparatus. The chlorine generator can be employed not only in the beverage dispenser but also in a water cooler, ice maker, automatic vendor or home water purifier having a water circuit for feeding the drinking water. The water source should not be limited to the service water but may be exemplified by drinking water which is reserved in a cassette tank and contains chlorine ions.

At the rear stage of chlorine generator 4, however, 0.7 ppm of active chlorine is retained. Depending upon the kind of bacteria, it is important to maintain an effective contact period between the active chlorine and bacteria. A sterilizing effect can be expected even against bacteria having high chlorine resistance by reserving a predetermined quantity of chlorine in the electrolysis cell 40 and by retaining it at the rear stage. In the sales water, as reserved in electrolysis cell 40 for a sales standby time, the active chlorine becomes deactive with time at a water temperature of 25° C. (see FIG. 5a), so that the active chlorine having the sterilizing action disappears. In order to suppress the propagation of bacteria in the feed pipelines, therefore, 0.7 ppm of active chlorine can be generated by energizing electrodes 40A and 40B for one hour each.

The beverage dispenser thus far described is characterized in that the chlorine generator for reserving the feed water to be electrolyzed is disposed downstream of the filter, and in that the electrolysis electrodes are immersed in the feed water or the reserved water. These characteristics provide a high sterilizing effect and do not enlarge the size of the electrode thereby allowing a reduction in the size of the apparatus. This size reduction is further promoted by mounting the electrolyzing electrodes in the filter allowing reduction of the connecting pipelines.

Figure 10A:
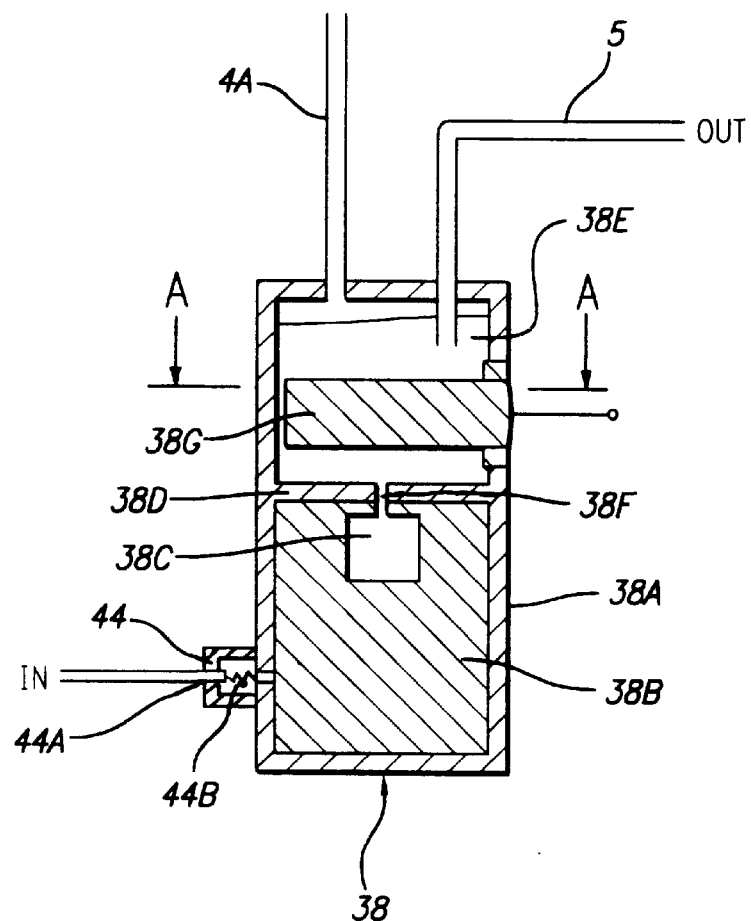
FIG. 10(a) is a longitudinal section of an electrode packaged filter.

FIG. 10(a)is a longitudinal section of electrode packaged filter 38. This filter includes: primary reservoir portion 38A formed in the lower portion of a cylindrical body ;for accommodating filter member 38B; secondary reservoir portion 38C formed over filter member 38B; tertiary reservoir portion 38E partitioned from secondary reservoir portion 38C through a partition portion 38D; passage 38F formed in partition portion 38D and having an internal diameter corresponding to that of the feed water pipeline; and electrodes 38G and 38G (later-described) arranged at a predetermined spacing on the side walls of tertiary reservoir portion 38E and adapted to be immersed in the filtered water or the feed water. By energizing electrodes 38G and 38G' disposed downstream of filter member 38B, chlorine in the feed water, deactivated by the filter, is activated to a predetermined chlorine concentration.

For the purposes of describing the following embodiment, the filtered water having passed through the filter member 38B will be deemed as the feed water, and the filtered water at and downstream of tertiary reservoir portion 38E will be deemed as the sales water.

In a particular embodiment, electrodes 38G and 38G' are formed to have a width w of 36 mm, a length l of 120 mm and a spacing of 3 mm (not-shown) and are positioned to be always immersed in the feed water reserved in tertiary reservoir portion 38E. To this tertiary reservoir portion 38E, there is connected degassing pipe 4A for discharging gases generated by feed water electrolysis. The invention is not, however, limited in any way to these dimensions, and one of skill in the art can readily design suitable electrodes which are of different dimensions.

Secondary reservoir portion 38C shown in FIG. 10(a) is a water collecting pipe, which contacts directly with filter member 38B so that the chlorine activated in the electrolysis cell may possibly contact filter member 38B and may be deactivated again. Therefore, passage 38F is formed to restrict the flow rate of the generated active chlorine to penetrate from the tertiary reservoir portion 38E into secondary reservoir portion 38C thereby to inhibit active chlorine from contacting the filter member and becoming inactive and has a flow resistance similar to that of the ordinary filter. On the other hand, this system aims at preventing the re-activated chlorine from flowing backward and from being deactivated by the reaction with filter member 38B, and can be replaced by a check valve. In an ordinary place having a low vacuum, although not shown, the chlorine generated by electrolysis cell 38E is disposed in secondary reservoir portion 38C, more specifically, the electrode-packaged filter can be constructed by setting chlorine generator 38G while considering the chlorine to be absorbed by filter member 38B.

In FIG. 10(a), input and output feed pipelines have internal diameters sufficiently smaller than an internal diameter of tertiary reservoir portion 38E, so that substantially stationary water is electrolyzed therein, while untreated water is supplied via input feed pipeline to filter member 38B, and purified water is supplied from tertiary reservoir portion 38E to output feed pipeline.

Figure 10B:
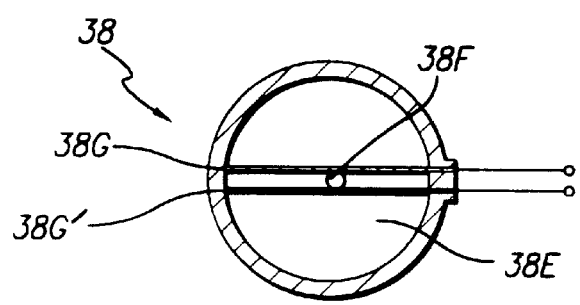
FIG. 10(b) is a cross section of electrode packaged filter.

FIG. 10(b) is a cross-section of electrode packaged filter 38, taken along a portion A—A of FIG. 10(a). Paired electrodes 38G and 38G' are inserted into tertiary reservoir portion 38E through the side wall of the cylindrical body.

A beverage dispenser serving as a drinking water feeding apparatus for diluted water or carbonated water can be equipped with the aforementioned electrode-packaged filter in feed pipelines. The packaging filter member 38B can have activated carbon for filtering the service water into feed water and a pair of electrodes for electrolyzing the filtered feed water. According to such a beverage dispenser, electrodes 38G are disposed downstream of filter member 38B to electrolyze the sales water just filtered, so that the feed pipeline portion between the filter and the chlorine generator, where the bacteria propagate, can be omitted to prevent inhibit propagation of the bacteria. By omitting the feed pipeline, it is possible to minimize the portion where the bacteria to be sterilized will propagate, realizing a small size.

Even if the number of live bacteria is increased by the various bacteria adsorbed by the filter member 38B of electrode-packaged filter 38, on the other hand, paired electrodes 38G arranged in the tertiary reservoir portion are energized to electrolyze the reserved feed water thereby generating active chlorine, so that the sales water to be fed to feed pipeline 5 can be fed with number of live bacteria, i.e., reduced by the sterilizing force of the active chlorine to the level of the number of live bacteria in the service water fed from intake pipe 1.

In some preferred embodiments of the invention, the filter member and the reservoir for electrolysis are disposed in one container such that the filter member is arranged on the feed side whereas the reservoir is arranged on the discharge side. As a result, at least two joint portions can be reduced to one part, and the construction of the feed pipelines is simplified. Further, since the electrodes are always wholly immersed in the feed water, the electrolysis efficiency can be kept constant to reduce the electrode consumption. Moreover, since the feed water corresponding to one sale of the sales water to be vended (e.g. to the cup) is reserved for the electrolysis, the reservoir portion can be shaped to the accommodation space without being elongated.

The invention has been described for the case in which an electrode-packaged filter according to the invention is used in a beverage dispenser, but the electrode-packaged filter can also be disposed in a water cooler, an ice maker or an automatic vendor or a home water purifier having a water circuit for feeding the drinking water therein.

In some preferred embodiments of the invention, the reserved drinking water is electrolyzed so that the drinking water contaminated in the filter can be reliably sterilized and fed downstream. As compared with the method of electrolyzing drinking water as it flows, the drinking water containing the active chlorine sufficient for the sterilization can be fed without lengthening the electrodes or reducing the flow speed of the drinking water.

In some preferred embodiments of the invention, the filter member is disposed on the feed side of the air-shielded container, and the paired electrode for the electrolysis is disposed on the discharge side of the container, so that active chlorine sufficient for, sterilization can be fed downstream. Unlike the arrangement in which the filter member and the electrolysis cell are separately arranged in different containers, moreover, drinking water containing no active chlorine will not reside in the pipeline between the container of the filter member and the electrolysis cell and the sterilizing ability will be improved.

In some preferred embodiments of the invention, electrolysis is performed in an air-shielded electrolysis cell so that no aerobacteria migrate. Since the water reserved in the electrolysis cell is electrolysis, on the other hand, the chlorine concentration of the drinking water can be easily maintained at a constant value which is independent of the water quality.

Since the cooling coil is arranged downstream of the air-shielded electrolysis cell, according to the second drinking water feeding apparatus of the invention, it is possible to prevent the reduction of the chlorine concentration of the drinking water emanating from the electrolysis cell. The effect is further improved if the electrolysis cell is also cooled.

Since at least one feed of the drinking water electrolyzed in the chlorine generator is reserved downstream of the chlorine generator, according to the third drinking water feeding apparatus of the invention, it is possible to feed the drinking water which is not contaminated by bacteria even for a long interval between feed.

In some preferred embodiments of the invention, the chlorine generator is equipped with a release unit for releasing gases generated by electrolyzing the drinking water such as hydrogen and oxygen gas, so that a drop of the electrolyzed water level can be prevented and a corresponding increase in the electrode current density can be prevented, thereby reducing necessary consumption of the electrodes. The release unit includes a gas release valve and associated control of the valve. Further, electrolyzed drinking water is fed by energizing the electrodes at the time of feeding the drinking water on the basis of the feed water pressure from the water source, so that drinking water having a predetermined chlorine concentration can be stably fed.

In some preferred embodiments of the invention, reserved drinking water in the electrolysis cell down stream of the filter is electrolyzed so that the contaminated drinking water in the filter can be reliably sterilized and fed downstream. As compared with the method of electrolyzing the flowing drinking water, the drinking water containing chlorine sufficient for the sterilization can be fed without lengthening the electrodes or reducing the flow speed of the drinking water.

In some preferred embodiments of the invention, a filter member is disposed on the feed side of the air-shielded container, and the paired electrode for the electrolysis is disposed on the discharge side of the container, so that chlorine sufficient for the sterilization can be fed downstream. Unlike the arrangement in which the filter member and the electrolysis cell are separately arranged in different containers, the drinking water containing no active chlorine will not reside in the pipeline between the container of the filter member and the electrolysis cell so that the sterilizing ability is improved.

In some preferred embodiments of the invention, there is provided an apparatus in which the sales water can be reserved in the electrolysis cell. During the sales standby time, when the bacteria propagate to the greatest extent in the pipelines, sales water is reserved in the electrolysis cell so that the number of live bacteria can be minimized. Even for bacteria having an especially high resistance, the number of live bacteria decreases to an order of about $10^2$ cfu/ml, (see FIG. 12), when the elapsed contact time is 30 minutes or more, so that the bacteria in the pipelines can be suppressed in number. Moreover, at the next feed, sales water having less bacterial contamination will be delivered.

FIG. 13(a) to (c) show an electrode-packaged filter in a further preferred embodiment. The electrode-packaged filter comprises housing 53, filter member 56 such as carbon contained in housing 53 to be formed with a recessed portion serving as electrolysis cell 55, and a pair of electrodes 54A and 54B extended inside electrolysis cell 55 and supported to be connected to a power source (not shown) by a top wall of housing 53, wherein feed pipelines (not shown) are connected to input 51 and output 52 provided on the top wall of housing 53. Filter member 53 has a height H (for example, 125 mm) and an outer diameter $D_1$ (for example, 83 mm), electrolysis cell 55 has an internal diameter $D_2$ (for example, 30 mm) and a height h (for example, 110 mm), and electrodes 54A and 54B having a length L (for example, 100 mm) are arranged to have a gap g (for example, 3 mm) therebetween. On the other hand, input 51 and output 52 have internal diameters $d_1$ (for example, 7 mm) and $d_2$ (for example, 7 mm) which are sufficiently smaller than the internal diameter $D_2$ of electrolysis cell 55, so that substantially stationary water is contained in electrolysis cell 55, while untreated water is supplied via input 51 to filter member 56, and purified water is supplied from electrolysis cell 55 via output 52 to a dispensing end (not shown). In this preferred embodiment, active chlorine generated by energizing electrodes 54A and 54B is penetrated into filter member 56, so that bacterial concentration is kept to be approximately the level $C_2$ inside filter member 56, and will never be above the level $C_3$.

The invention will be further illustrated in the following examples, which do not limit the scope of the invention as defined by the claims.

EXAMPLES

Example 1

Performance of a Beverage Dispenser

Table 2 shows changes in the residual chlorine concentrations of individual portions of sales water dispensed from the beverage dispenser shown in FIG. 1.

TABLE 2

| | Residual Chlorine Concentrations | | | | |
|---|---|---|---|---|---|
| | $H_0$ | $H_1$ | $H_2$ | $H_3$ | $H_4$ |
| initial value | 0.42 | 0.42 | 0.40 | 0.42 | 0.44 |
| 1st cup | 0.42 | 0.24 | 0.29 | 0.25 | 0.07 |
| 2nd cup | 0.43 | 0.31 | 0.32 | 0.30 | 0.21 |
| 3rd cup | 0.42 | 0.27 | 0.28 | 0.27 | 0.12 |
| 4th cup | 0.43 | 0.25 | 0.17 | 0.24 | 0.06 |
| 5th cup | 0.38 | 0.05 | 0.02 | 0.07 | 0.02 |
| 6th cup | 0.31 | 0.02 | 0.02 | 0.03 | 0.02 |

Twenty cups of sales water were vended for: a single cup feed volume of 150 cc, an electrode "ON" time period of 7 seconds at the feed water time, a current value of 800 mA, at a feed water interval of 4 cups/minute, a vending flow rate of 30 cc/second, an electrode current density of 2 A/dm² or smaller. With the initial value of the residual chlorine concentration of the sales water as sampled at the $20^{th}$ cup, electrodes 40A and 40B of chlorine generator 4 were left deenergized from the preceding feed water action. After this, the residual chlorine concentrations of the next 6 cups of sales water, as sampled without energizing the electrodes, were metered at the respective times of $H_0$ (just after the sampling), $H_1$, $H_2$, $H_3$ and $H_4$ hours later. The time $H_4$ is set being assumed the end of consecutive holidays (e.g., 67 hours). The residual chlorine concentrations were metered by calorimetry according to the DPD method. For the initial value or the sales water after the 20th cup had been vended, the residual chlorine concentration of about 0.4 ppm was metered just after sampling, and the aging was low even after time $H_4$.

As to the 6 cups of drinking water sampled after the preceding vending operation: the $1^{st}$ cup is the sales water which has resided in the piping from valve 17 to the exit portion of cooling coil 10; the $2^{nd}$ and $3^{rd}$ cups are the sales water which has resided in cooling coil 10; the $4^{th}$ cup is the sales water which has resided in the piping from the entrance portion of cooling coil 10 to feed pump 8; the $5^{th}$ cup is the sales water which has resided in the piping from feed pump 8 to chlorine generator 4 (including some residual water in the container); and the $6^{th}$ cup is the sales water which has resided in chlorine generator 4. According to this beverage dispenser, therefore, the electrolyzed sales water is retained in the connecting pipelines from the rear stage of the chlorine generator to the feed valve so that the sales water, uncontaminated by bacteria, can be fed in the next vending operation even for a long interval between feeds.

The $2^{nd}$ and $3^{rd}$ cups of sales water have a low rate of residual chlorine concentration loss due to cooling. These cups keep an active chlorine concentration having a predetermined value (ca. 0.2 ppm) at the exit of valve 17, even 67 hours later. Thus, the residual water in the cooling coil retains its chlorine concentration even after 67 hours.

Table 3 tabulates the chlorine concentrations of the individual portions, as based on the chlorine generation by the electrolytic action of chlorine generator 4 at instant $t_n$.

TABLE 3

Chlorine Concentrations of Individual Portions

| | Chlorine concentration (ppm) |
|---|---|
| $1^{st}$ cup | 0.24 |
| $2^{nd}$ cup | 0.31 |
| $3^{rd}$ cup | 0.27 |
| $4^{th}$ cup | 0.26 |
| $5^{th}$ cup | 0.27 |
| $6^{th}$ cup | 0.32 |

According to these data, even when chlorine generator 4 is operated while the sales water resides, two cups of sales water are left in the piping between chlorine generator 4 and cooling coil 10, so that the chlorine concentration of the sales water of cooling coil 10 is hardly influenced.

Example 2
Bacterial Concentrations in a Beverage Dispenser

Generally, some bacteria have a high resistance, and others do not. The highly resistive bacteria are capable of surviving in the presence of chlorine in the service water, enterococcua, or the like. On the other hand, the bacteria having a low resistance are colibacillus groups, as called the "pollution index bacteria". In the bacteria highly resistive to the active chlorine, the extra-bacterial protein acts as a barrier against active chlorine, which has to break the extra-bacterial protein before it penetrates into the bacteria, so that active chlorine takes a considerable time to penetrate.

Figure 11:
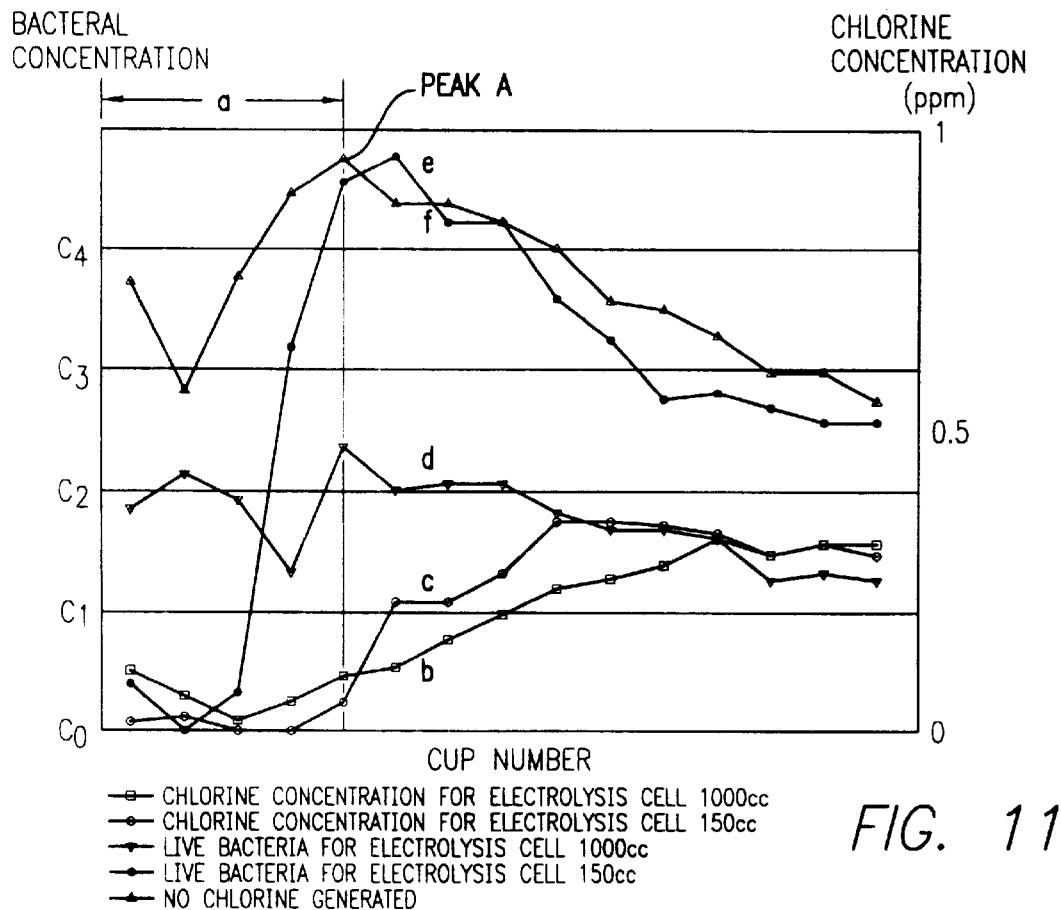
FIG. 11 plots the relative bacterial concentration and the chlorine concentrations for individual servings from beverage dispensers having electrolysis cells with different volumes, and for a beverage dispenser with no electrolysis cell in operation.

FIG. 11 plots the bacterial concentration and the chlorine concentrations for the sales (expressed as cup number) when the beverage dispenser makes consecutive sales under conditions where bacteria of a high chlorine resistance propagate in the filter. A range, indicated by the letter a in FIG. 11, indicates the bacterial concentration and the chlorine concentrations, as contained in the sales beverage initially dispensed when the beverage is consecutively vended. The initial cups of sales beverage contain residue in the pipeline including the filter and the downstream chlorine generator. The range after range a indicates the bacterial concentration and the chlorine concentrations of the sales beverage, as contained in the sales beverage dispensed subsequently to the initial cups when the beverage is consecutively vended. The sales beverage for these cups has been reserved in the cartridge of the filter. In the beverage for later cups, the water in the cartridge is vended, and the bacteria on the filtering material are carried away by the feed water so that the bacterial concentration is gradually reduced at every sale.

Conditions labeled as f in FIG. 11 show the bacterial concentration at sales when the chlorine generator is not used. It is found that the beverage dispenser with no electrolysis has large bacterial concentrations at individual sales and that the sales beverage contained in the filter obviously has the highest bacterial concentration.

Conditions c of FIG. 11 report the chlorine concentrations in sales when consecutive sales were made by the beverage dispenser using a chlorine generator equipped with the electrolysis cell having a capacity of 150 cc. In initial sales, the residual product was present in the pipelines including the filter and the downstream chlorine generator so that the chlorine concentration was lowered by the aging change in the pipelines. At and after the initial sales, on the other hand, 340 ml of water in the cartridge of the filter was introduced into the electrolyzing cell for electrolysis. Here, the quantity of chlorine exhibits a transient state after the initial sales and before the sales of subsequent cups. This is because the active chlorine is deactivated by the reaction with highly resistant bacteria.

Conditions e of FIG. 11 report the bacterial concentration for sales when consecutive sales were made by the beverage dispenser using a chlorine generator equipped with an electrolysis cell having a capacity of 150 cc. In this case, the capacity of 150 cc of the electrolysis cell means that 150 cc of sales water containing a predetermined chlorine concentration is reserved in the electrolysis cell so that it is mixed with the feed water in the electrolysis cell. As a result, the feed water, flowing at a rate of 30 cc per second into the electrolysis cell, flows out as sales water at a rate of 30 cc per second while being mixed with 150 cc of water which has been reserved in the electrolysis cell and has a predetermined chlorine concentration. As a result, the feed water can maintain an effective period of contact time with the active chlorine against the bacteria.

Under conditions e of FIG. 11, therefore, the sales beverage contains a high chlorine concentration in the pipelines downstream of the chlorine generator for the initial cups so that a sufficient period of contact time between the active chlorine and the bacteria is maintained to keep a low bacterial concentration. For the cups after initial sales, however, 340 ml of sales water in the cartridge of the filter is fed to the electrolysis cell. As a result, the chlorine concentration cannot be maintained at the value of 0.2 ppm which is necessary for killing the highly resistive bacteria. Thus, the concentration of bacteria rises to a peak. At and after the initial sales, as illustrated by conditions c of FIG. 11, 0.25 ppm or more of active chlorine is generated by the chlorine generator so that it can suppress the bacterial concentration. As a result, the bacterial concentration is less than that observed under conditions f with no electrolysis.

From the description thus far made, propagation of resistive bacteria is compared during consecutive sales between a beverage dispenser having a chlorine generator equipped with an electrolysis cell of the capacity of 150 cc and the beverage dispenser having no chlorine generator. It is found that a beverage dispenser having a chlorine generator exhibits a greater sterilizing effect, but that sales water reserved in the filter makes insufficient contact with the chlorine, and that the chlorine concentration cannot be maintained at a concentration of 0.2 ppm necessary for killing the highly resistant bacteria so that the beverage dispenser has no sterilizing effect even with a chlorine generator.

When a chlorine generator having a 150 cc electrolysis cell is used, the beverage dispenser has no sterilizing effect on the sales water reserved in the filter. This is because the electrolysis cell has such a small capacity that the chlorine is insufficient to sterilize the water reserved in the filter when the filter water of the flows into the chlorine generator. By enlarging the electrolysis cell to increase the reserve capacity, therefore, the time period of contact between the active chlorine and the bacteria can be lengthened to enable effective sterilization of the sales water reserved in the filter.

Conditions b of FIG. 11 report the chlorine concentrations in the individual consecutive sales from the beverage dispenser which uses a chlorine generator equipped with an electrolysis cell having a capacity of 1,000 cc.

On the other hand, conditions d report the bacterial concentration in individual sales of this example. It is found that the initial cups of sales water are in the pipelines at and downstream of chlorine generator 4 and contain a high chlorine concentration and that the sales water has a higher sterilizing ability than that of conditions f without the electrolysis, so that the bacterial concentration is two orders of magnitude lower. For the subsequent cups, on the other hand, when 340 ml of water in the cartridge of the filter is fed to the electrolysis cell, it is mixed with 1,000 cc of water reserved in the electrolysis cell having a predetermined chlorine concentration. As compared with the case in which the electrolysis cell has a 150 cc capacity, the time contact between the active chlorine and the bacteria increases, so that the bacterial concentration is effectively suppressed without exhibiting any peak. For the later sales, moreover, the bacterial concentration can be effectively suppressed at all times low levels.

Figure 12:
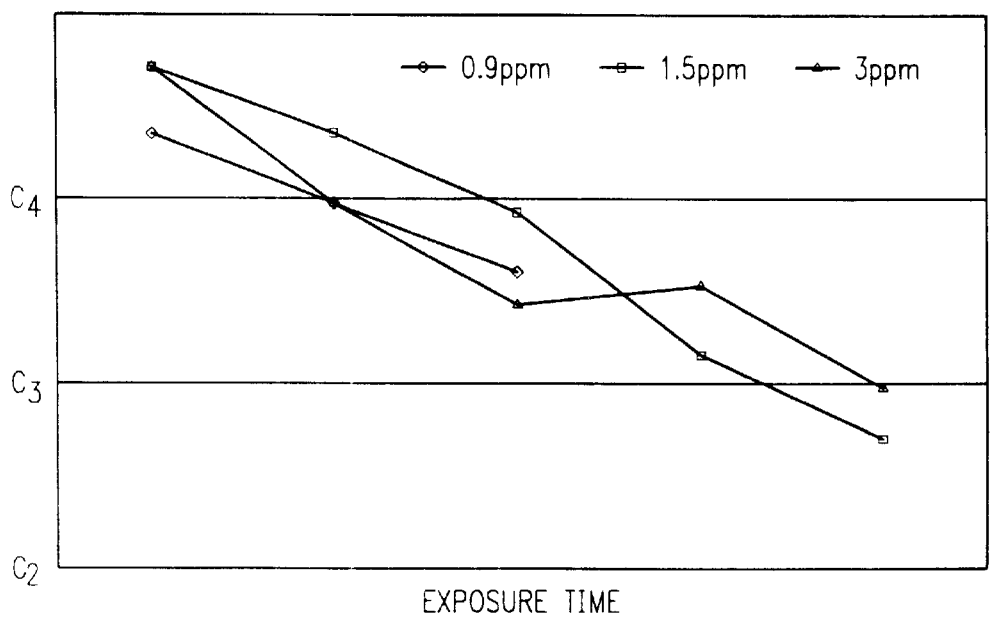
FIG. 12 is a graph showing the extent of bacterial death in three water samples with different chlorine concentrations.

FIG. 12 is a graph plotting the extent of bacterial death. The bacteria were of a highly resistant strain living in the service water and sampled from the faucet, and were cultured in 15 MPN/100 ml in the filter so that the initial bacteria were extracted in about 105 cfu/ml. The graph of FIG. 12 plots the relationship between the highly resistant bacteria and the kill time period for three samples of water having chlorine concentrations of 0.9 ppm, 1.5 ppm and 3.0 ppm generated in the chlorine generator. The water sample size was 200 cc. These results indicate that to kill highly resistant bacteria, contact time is generally more important than chlorine concentration.

As described herein before, feed water flowing at a rate of 30 cc per second into the electrolysis cell is mixed with 1,000 cc of the reserved water having a predetermined chlorine concentration so that it flows out as sales water at a rate of 30 cc per second. As a result, the mixing ratio increases more than that of the capacity of 150 cc so that the contact time of chlorine with bacteria can be maintained to suppress the bacterial concentration effectively at all times.

Thus, the time period for the bacteria to die can not be maintained by the direct sterilizing or fungistatic treatment of the filter. If chlorine is prevented from acting directly on the filtering material of the filter, on the other hand, the lifetime of the filter can be made longer than that of the case in which chlorine does act directly. This effect is further improved not only by reserving sales water in the electrolysis cell but also by selecting a filter such as a UV filter having different sterilizing mechanisms; an MF filter having a pore size of about 0.5 microns so as to cause the filtering material to absorb bacteria having a size of 1 micron or more and to prevent the bacteria from flowing downstream of the filter; or a carbon block type filter. Moreover, this method may be combined with a variety of sterilizing methods such: a method of establishing conditions, in which the bacteria do not propagate well, by keeping the temperature of the feed water or the reserved water in the filter at 10° C. or lower; a method of heating the feed water to a temperature of 63° C. or higher, at which the bacteria are apt to die; a method of using ozone in the pipelines; or a method of sterilizing the bacteria by the electron mobility reaction in a low potential range (at 0.74 V).

On the other hand, low resistance bacteria such as colibacillus will almost certainly die under the conditions of pH 7.0, 20 to 25° C., 0.055 ppm chlorine and 1 minute of contact time. When electrodes 40A and 40B are fed with a constant electric current of 800 mA with a current density of 2 A/dm$^2$ or less, for example, a constant chlorine concentration can be obtained. Under these conditions, 90% of the water quality falls within a chlorine ion concentration of 5 to 50 ppm and a conductivity of 50 to 500 $(\Omega \cdot cm)^{-1}$. As a result, the chlorine concentration, as produced by chlorine generator 4, is higher than 0.2 ppm, and is capable of killing pollution-indexing bacteria such as colibacillus, and water downstream of chlorine generator 4 has sterilizing action sufficient for both the vending time and the standby time.

In the beverage dispenser thus far described, electrodes 40A and 40B of chlorine generator 4 are energized simultaneously with the feed water start of the sales water. In response to the feed water command, however, electrodes 40A and 40B may be energized, and feed pump 8 may be driven after 1 second to vend the sales water.

According to the beverage dispenser thus far described, even if the bacteria absorbed by the filter member are discharged to the reservoir, electrolysis is performed on a predetermined quantity of reserved feed water so that chlorine can be generated in a sufficient sterilizing quantity. When the electrolysis electrodes are not provided on the side walls of the reservoir, the electrolysis electrodes are always wholly immersed in the feed water even if the water level changes, so that the electrolysis efficiency can be kept constant while the electrode consumption of the can be minimized. Since a feed water quantity corresponding to one sale of sales water is reserved for electrolysis, on the other hand, the shape of the reservoir is not elongated but can match the accommodation space. Since one sale of feed water is reserved for electrolysis, on the other hand, sales water can be fed at an ordinary vending rate so that the quick service is achieved. Moreover, the chlorine concentration can be controlled properly and simply. Further, the water level is always kept at a predetermined level without providing any water level sensor so that the electrolysis efficiency can be kept at a predetermined level. If the feed water according to one sale is reserved so that it may be electrolyzed each time the sales water is vended, on the other hand, the water line is filled up with the sales water having the predetermined chlorine concentration so that the bacteria will not propagate even the sales water resides.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A water purifier apparatus for water containing chloride ions comprising:
   a) an air-shielded water container having an input to receive untreated water containing chloride ions and an output for purified water, a cross-sectional area of said container being larger than cross-sectional areas of said input and said output thereby lowering a flow velocity of water in said container to be less than velocities of water at said input and said output;
   b) a power source;
   c) a pair of electrolysis electrodes within said container, said electrodes being electrically connected to receive power from said power source;
   d) a valve fluidly connected with said container so as to control water flow therethrough;
   e) a power control electrically connected to said valve and to said power source, said control being arranged to apply power to said electrodes to carry out electrolysis of flow velocity-lowered water in said container when said valve is opened for said input to receive said untreated water and for said output to supply said purified water in a direction of a dispensing end; and
   f) a gas release valve for releasing gas from said container.

2. The water purifier of claim 1, wherein said gas release valve maintains a positive pressure within said container.

3. The water purifier of claim 1, further comprising a gas conduit fluidly connected to said gas release valve.

4. The water purifier of claim 1, further comprising a gas release control, wherein said gas release valve is electrically connected to and controlled by said gas release control.

5. The water purifier of claim 4, further comprising a timer connected to said power control, wherein said timer records a time during which no electrolysis is carried out, and said power control controls said power source to apply power to said electrodes for electrolysis of said flow velocity-lowered water in said container when said time becomes a predetermined time.

6. The water purifier of claim 4, further comprising an "ON" time register connected to said power control for accumulating total elapsed time of electrolysis, and which signals said gas release control when the total elapsed electrolysis time reaches a predetermined value.

7. The water purifier of claim 6, wherein said signal to said gas release control comprises a signal to open said gas release valve.

8. The water purifier of claim 1, further comprising a flow-through temperature modification tube for temperature modification of purified water flowing through said tube, wherein said tube has its input fluidly connected to said output of said container, said temperature modification tube being immersed in a tank containing water at a controlled temperature, and further comprising a gas conduit fluidly connected to said gas release valve to receive said gas.

9. The water purifier of claim 1, wherein the pair of electrolysis electrodes is exposed to substantially the entire contents of said water container.

10. The water purifier of claim 9, wherein the quantity of substantially stationary water is a fixed quantity.

11. The water purifier apparatus according to claim 9, further comprising an in-line water filter fluidly connected upstream of said electrodes.

12. The water purifier of claim 11, wherein the water filter is located within said air-shielded container.

13. The water purifier of claim 9, wherein said power control turns the power source "ON" and "OFF" to determine the duration of electrolysis.

14. The water purifier of claim 13, further comprising a timer electrically connected to said power source wherein said timer is adapted to signal said power control to apply power to said electrodes when time between dispensing exceeds a predetermined maximum dormancy time.

15. The water purifier apparatus according to claim 13, further comprising a flow through temperature modification tube for temperature modification of purified water flowing through said tube, wherein said tube has its input fluidly connected to said output of said container, said temperature modification tube being immersed in a tank containing water at a controlled temperature.

16. The water purifier of claim 15, further comprising a refrigeration apparatus to cool tank water wherein the temperature modification is cooling and said tank is adapted to contain refrigerated water.

17. The water purifier apparatus according to claim 15 further comprising an untreated water temperature sensor, and a water tank temperature sensor, wherein both temperature sensors are electrically connected to said power control, wherein said power control is adapted to determine the difference between temperatures sensed by said temperature sensors, and wherein said power control is adapted to supply power to said electrodes to carry out electrolysis for a duration related to the temperature difference between untreated water and tank water as detected by said sensors.

18. The water purifier of claim 17, wherein the electrolysis duration is inversely related to said temperature difference.

19. A dispensing apparatus for dispensing a beverage comprising the water purifier apparatus of claim 9, and further comprising: a source of flavoring; a mixer connected to receive and mix purified water from said water purifier apparatus; flavoring from said source of flavoring, and a nozzle for dispensing the resulting mixture.

20. The dispensing apparatus of claim 19 further comprising a source of carbon dioxide gas; and carbon dioxide gas from said source of carbon dioxide gas.

21. The dispensing apparatus of claim 19, wherein the dispensing apparatus is adapted to dispense beverage in at least one fixed dispensing volume.

22. The dispensing apparatus of claim 21, wherein the volume of the container is substantially the same as a fixed dispensing volume.

23. The dispensing apparatus of claim 22, wherein one of said dispensing volumes is the largest of said dispensing volumes, and wherein the volume of said container is substantially the same as the largest of said dispensing volumes.

* * * * *